United States Patent
Fukuda et al.

(10) Patent No.: US 7,908,171 B2
(45) Date of Patent: Mar. 15, 2011

(54) INFORMATION PROVIDING SYSTEM AND INFORMATION PROVIDING METHOD FOR PROVIDING ADVERTISEMENT INFORMATION BASED ON KEYWORDS ASSOCIATED WITH CONTENT

(75) Inventors: Kazuhiro Fukuda, Kanagawa (JP); Tetsuo Maruyama, Tokyo (JP); Tetsu Sumita, Tokyo (JP)

(73) Assignees: Sony Corporation, Tokyo (JP); Plat-Ease Corporation, Tokyo (JP)

( * ) Notice: Subject to any disclaimer, the term of this patent is extended or adjusted under 35 U.S.C. 154(b) by 501 days.

(21) Appl. No.: 11/939,197

(22) Filed: Nov. 13, 2007

(65) Prior Publication Data

US 2008/0114762 A1   May 15, 2008

(30) Foreign Application Priority Data

Nov. 14, 2006   (JP) ................ 2006-308399

(51) Int. Cl.
*G06Q 30/00*   (2006.01)
(52) U.S. Cl. ............ 705/14.52; 707/707; 707/739; 707/751
(58) Field of Classification Search .......... None
See application file for complete search history.

(56) References Cited

U.S. PATENT DOCUMENTS

| | | | | |
|---|---|---|---|---|
| 7,281,042 | B2* | 10/2007 | Hsu et al. ........... | 709/224 |
| 2002/0002525 | A1* | 1/2002 | Arai et al. .......... | 705/37 |
| 2002/0038241 | A1* | 3/2002 | Hiraga ............... | 705/14 |
| 2004/0163107 | A1* | 8/2004 | Crystal .............. | 725/32 |
| 2004/0243565 | A1* | 12/2004 | Elbaz et al. ........ | 707/3 |
| 2005/0015796 | A1* | 1/2005 | Bruckner et al. .... | 725/32 |
| 2005/0038894 | A1* | 2/2005 | Hsu et al. .......... | 709/228 |
| 2006/0068919 | A1* | 3/2006 | Gottfurcht .......... | 463/42 |
| 2007/0143176 | A1* | 6/2007 | Nong et al. ......... | 705/14 |
| 2008/0010144 | A1* | 1/2008 | Chatwin et al. ..... | 705/14 |
| 2008/0167943 | A1* | 7/2008 | O'Neil et al. ...... | 705/10 |

FOREIGN PATENT DOCUMENTS

| | | |
|---|---|---|
| JP | 2002-183585 | 6/2002 |
| JP | 2004-62446 | 2/2004 |
| JP | 2006-222620 | 8/2006 |

* cited by examiner

*Primary Examiner* — Apu M Mofiz
*Assistant Examiner* — Hung D Le
(74) *Attorney, Agent, or Firm* — Oblon, Spivak, McClelland, Maier & Neustadt, L.L.P.

(57) ABSTRACT

The present invention provides an information providing system including an information registration unit capable of registering a front keyword for use in relation to content or content information to be provided a user terminal and back keywords set in relation to the front keyword can be registered, an advertisement registration unit capable of registering advertisement information for use in relation to the back keyword and an information providing unit capable of providing the advertisement information to the user terminal. The advertisement registration unit is capable of selecting specific advertisement information through an auction transaction. The information providing unit is capable of displaying keyword buttons enabling keyword selection in a display screen at the user terminal.

18 Claims, 21 Drawing Sheets

FIG.19

```
<program g_or_d="crid://provider.com/p0001"broadcast_station_program id="P12345678" name="FUN FACTS">
    <title value="FUN FACTS"/>
    <genre name="VARIETY"/>
    <synopsis value="YOUR TEETH; LIFELONG FRIENDS? TAKE GOOD CARE OF THEM NOW;"/>
    <CrediteList>
        <cast id="1_1" name="MASAAKI KASAI"/>
        <cast id="1_2" name="ANNOUNCER"/>
        <cast id="1_3" name="GUEST 1"/>
    </CrediteList>
    <oa_list>
        <oa start_date="2006/11/15" start_time="22:00:00" duration="02:00:00"/>
    </oa_list>
    <advertisement_keyword name="CLEAN TEETH"/>     → FRONT KEYWORD
        <ura_keyward name="TOOTHBRUSH"/>            → BACK KEYWORD
        <ura_keyward name="TOOTHPASTE"/>            → BACK KEYWORD
    ...
    <advertisement_keyword/>
    <advertisement_keyword name="XYLITOL"/>
    ...
</program>
```

FIG.20

```
<advertisement_keyword name="KAGYOKU TOOTHBRUSH"/>
<title value="INTRODUCING KAGYOKU TOOTHBRUSH"/>
<genre name="DAILY HYGIENE PRODUCT"/>
<keyword="SUPERFINE BRISTLES DURABLE"/>
<synopsis value="NEW PRODUCT FROM KAGYOKU COMING OUT ON DECEMBER 1"/>
<awards title="ADVERTISING AWARD WINNER"/>
</advertisement>
```

FIG.21

```
<goods name="LETTERS TO FORCE"/>
    <title value="LETTERS TO FORCE"/>
    <genre name="MOTION PICTURE"/>
    <media_type name="DVD"/>
    <keyword="DOG・DOCUMENTARY・TROUBLED WORLD"/>
    <synopsis value="DEAREST FORCE, THIS IS A LETTER TO YOU-
                     RAY OF HOPE IN THIS TROUBLED WORLD"/>
    <Awards title="MACADEMY AWARD WINNER"/>
</goods>
```

INFORMATION PROVIDING SYSTEM AND INFORMATION PROVIDING METHOD FOR PROVIDING ADVERTISEMENT INFORMATION BASED ON KEYWORDS ASSOCIATED WITH CONTENT

CROSS REFERENCES TO RELATED APPLICATIONS

The present invention contains subject matter related to Japanese Patent Application JP 2006-308399 filed in the Japan Patent Office on Nov. 14, 2006, the entire contents of which being incorporated herein by reference.

BACKGROUND OF THE INVENTION

1. Field of the Invention

The present invention relates to a technology whereby advertisement information provided by a sponsor is selected in relation to content or content information provided from a content holder and then the content is provided to the user for viewing.

2. Description of the Related Art

We have seen in recent years the advent of technologies that enable keyword search of specific content such as video, music, an image or text information, and information for use in relation to the content through a search of meta-data appended to content. In addition, technologies whereby advertisement information is displayed at the user's viewing terminal, the user's display device or the like as content is delivered to the user have come to be used commonly in recent years. The pertinent technologies disclosed in these areas include, for instance, a filtering technology disclosed in Japanese Laid Open Patent Publication No. 2002-183585, whereby advertisement information is filtered based upon conditions set by a content provider or a user. Another such example is a technology disclosed in Japanese Laid Open Patent Publication No. 2004-62446 adopted to collect information available on a network in correspondence to specific user interests. The advertisement bid invitation system that determines a specific advertisement to be attached to program information through an Internet auction, disclosed in Japanese Laid Open Patent Publication No. 2006-222620, represents another example of a pertinent technology. Through this system, advertisement bids can be tendered and accepted based upon the date/time at which the specific program is to be provided, the program genre, a keyword set in relation to the program or a program timetable.

SUMMARY OF THE INVENTION

However, even by combining the technologies described above, it is not easy to provide advertisement information to the user in an effective manner reflecting the intent of the content holder and the intent of the sponsor providing the advertisement information. Moreover, it is not easy to provide advertisement information closely reflecting the tastes and interests of a particular user by using a search keyword specified by the user when searching for information for use in relation to the content.

Accordingly, the present invention, having been completed so as to partially or entirely overcome the challenges discussed above, provides a new and improved information providing system, a new and improved information providing method and a new and improved program with which advertisement information can be provided to a user based upon "front keyword" used by the user when searching for information for use in relation to content and "back keyword" set in relation to the front keyword.

According to an embodiment of the present invention, there is provided an information providing system including an information registration unit capable of registering a front keyword for use in relation to content or content information to be provided to a user terminal and back keyword set in relation to the front keyword, an advertisement registration unit capable of registering advertisement information for use in relation to the back keyword and an information providing unit capable of providing the advertisement information to the user terminal.

The information registration unit in the information providing system includes a front keyword registration unit that registers the front keyword for use in relation to the content or content information, and a back keyword registration unit that registers the back keyword for use in relation to the front keyword and an advertisement information registration unit that obtains the advertisement information having been registered by the advertisement registration unit and sets the advertisement information in relation to the back keyword.

In addition, the advertisement registration unit included in the information providing system includes an advertisement selection unit that selects advertisement information to be set in relation to the back keyword based upon bid information corresponding to the particular back keyword, obtained from sponsor terminals belonging to sponsors providing the advertisement information and an advertisement registration unit that registers the advertisement information having been selected by the advertisement selection unit.

The information providing unit in the information providing system includes a display control unit that displays at the user terminal the front keyword together with a keyword button operated to select the front keyword and an advertisement providing unit that receives the front keyword selected through a keyword button and provides to the user terminal the advertisement information selected by the advertisement selection unit in correspondence to the back keyword registered in relation to the front keyword.

The front keyword registration unit in the information registration unit registers the front keyword for use in relation to the content or content information. The back keyword registration unit registers the back keyword set in relation to the front keyword. The advertisement information registration unit obtains advertisement information having been registered by the advertisement registration unit and sets the advertisement information in relation to the specific back keyword. The advertisement selection unit included in the advertisement registration unit selects advertisement information to be set in relation to each back keyword based upon bid information corresponding to the particular back keyword obtained from the sponsor terminals belonging to the sponsors providing the advertisement information. The advertisement registration unit in the advertisement registration unit registers the advertisement information having been selected by the advertisement selection unit. The display control unit in the information providing unit brings up on display at the user terminal the front keyword and keyword button to be operated in order to select the keyword. The advertisement providing unit receives from the user terminal the front keyword selected with the keyword button and provides to the user terminal the advertisement information selected by the advertisement selection unit in correspondence to the back keyword registered in relation to the front keyword.

The embodiment described above makes it possible to control the advertisement information displayed at the user terminal in line with the intent of the content holder providing the content and, at the same time, makes it possible to fully automate or semi-automate selection of sponsors to provide advertisement information to the user terminal. As a result, advertisement information reflecting both the intent of the content holder and the intent of the sponsors can be provided to the user terminal.

In addition, the advertisement selection unit in the advertisement registration unit described above may adopt a structure that allows it to select a predetermined number of sets of advertisement information with highest bids tendered in correspondence to each back keyword among a plurality of sets of advertisement information submitted for bidding in correspondence to the particular back keyword.

The structure described above makes it possible to automatically or semiautomatically select advertisement information in correspondence to the individual registered back keywords.

The advertisement selection unit included in the advertisement registration unit described above may adopt a structure that allows it to select fewer sets of advertisement information among the predetermined number of sets of advertisement information with the highest bids based upon specific conditions determined in advance by the content holder providing the content and the advertisers providing the advertisement information.

The embodiment makes it possible to exclude any undesirable advertisement information as far as a specific sponsor or the content holder is concerned from the advertisement information having been selected automatically or semiautomatically.

The advertisement selection unit in the advertisement registration unit may adopt a structure that allows it to extract sets of advertisement information of a specific type from the predetermined number of sets of advertisement information with the highest bids and select a specific number of sets of advertisement information with higher bids only.

The embodiment described above makes it possible to automatically or semiautomatically exclude advertisement information from competing sponsors to a certain extent.

According to another embodiment of the present invention, there is provided an information providing method through which advertisement information for use in relation to a specific back keyword can be provided to a user terminal based upon a front keyword for use in relation to content to be provided to the user terminal and a back keyword for use in relation to the front keyword.

The information providing method includes a front keyword registration step in which a front keyword for use in relation to content is registered, a back keyword registration step in which a back keyword for use in relation to the front keyword is registered, an advertisement selection step in which advertisement information to be set in relation to the particular back keyword is selected based upon bid information obtained from sponsor terminals providing advertisement information in correspondence to the back keyword, an advertisement registration step in which the advertisement information having been selected through the advertisement selection step is registered, a back keyword registration step in which the advertisement information having been registered through the advertisement registration step is set in relation to the back keyword, a display control step in which the front keyword and keyword button to be operated to select a front keyword are brought up on display at the user terminal and an advertisement providing step in which the front keyword selected through operation of the keyword button is received from the user terminal and the advertisement information having been selected through the advertisement selection step is provided to the user terminal in correspondence to the back keyword registered in relation to the front keyword.

In the front keyword registration step, a front keyword for use in relation to content is registered. In the back keyword registration step, a back keyword for use in relation to the front keyword is registered. In addition, in the advertisement selection step, advertisement information to be set in relation to the back keyword is selected based upon the bid information corresponding to the back keyword obtained from sponsor terminals providing the advertisement information. In the advertisement registration step, the advertisement information having been selected through the advertisement selection step is registered. In the back keyword registration step, the advertisement information having been registered through the advertisement registration step is set in relation to the back keyword. In the display control step, the front keyword is brought up on display at the user terminal together with the keyword button to be operated to select the front keyword. In the advertisement providing step, the front keyword having been selected through an operation of the keyword button is received from the user terminal and the advertisement information having been selected through the advertisement selection step based upon the back keyword registered in relation to the front keyword is provided to the user terminal.

The embodiment described above makes it possible to control the advertisement information displayed at the user terminal in line with the intent of the content holder providing the content and, at the same time, makes it possible to fully automate or semi-automate selection of sponsors to provide advertisement information to the user terminal. As a result, advertisement information reflecting both the intent of the content holder and the intent of the sponsors may be provided to the user terminal.

According to another embodiment of the present invention, there is provided a program enabling a computer to fulfill a function of providing to a user terminal advertisement information for use in relation to a specific back keyword based upon a front keyword for use in relation to content to be provided to the user terminal and the back keyword for use in relation to the front keyword.

The program enables the computer to fulfill a front keyword registration function through which the front keyword for use in relation to content is registered, a back keyword registration function through which the back keyword for use in relation to the front keyword is registered, an advertisement selection function through which advertisement information to be set in relation to the particular back keyword is selected based upon bid information obtained from sponsor terminals providing advertisement information in correspondence to the back keyword, an advertisement registration function through which the advertisement information having been selected through the advertisement selection function is registered, a back keyword registration function through which the advertisement information having been registered through the advertisement registration function is set in relation to the back keyword, a display control function through which the front keyword and keyword button to be operated to select the front keyword are brought up on display at the user terminal and an advertisement providing function through which the front keyword having been selected through the keyword button is received from the user terminal and the advertisement information selected through the advertisement selection function is provided to the user terminal in correspondence to the back keyword registered in relation to the front keyword.

The program described above enables the computer to fulfill the following functions. Through the front keyword registration function, a front keyword for use in relation to content is registered. Through the back keyword registration function, a back keyword for use in relation to the front keyword is registered. In addition, through the advertisement selection function, advertisement information to be set in relation to the back keyword is selected based upon the bid information corresponding to the back keyword obtained from sponsor terminals providing the advertisement information. Through the advertisement registration function, the advertisement information having been selected through the advertisement selection function is registered. Through the back keyword registration function, the advertisement information having been registered through the advertisement registration function is set in relation to the back keyword. Through the display control function, the front keyword is brought up on display at the user terminal together with the keyword button to be operated to select the front keyword. Through the advertisement providing function, the front keyword having been selected through an operation of the keyword button is received from the user terminal and the advertisement information selected through the advertisement selection function based upon the back keyword registered in relation to the front keyword is provided to the user terminal.

The embodiment described above makes it possible to control the advertisement information displayed at the user terminal in line with the intent of the content holder providing the content and, at the same time, makes it possible to fully automate or semi-automate selection of sponsors to provide advertisement information to the user terminal. As a result, advertisement information reflecting both the intent of the content holder and the intent of the sponsors may be provided to the user terminal.

According to the embodiments of the present invention described above, advertisement information may be provided to a user in an effective manner based upon a front keyword used by the user to search for information for use in relation to specific content and back keywords for use in relation to the front keyword.

BRIEF DESCRIPTION OF THE DRAWINGS

FIG. 19 presents an example of a content information format that may be adopted in the embodiment;

FIG. 20 presents an advertisement information format that may be adopted in the embodiment; and FIG. 21 presents an example of physical sales product information format that may be adopted in the embodiment.

DETAILED DESCRIPTION OF THE PREFERRED EMBODIMENTS

Figure 1:
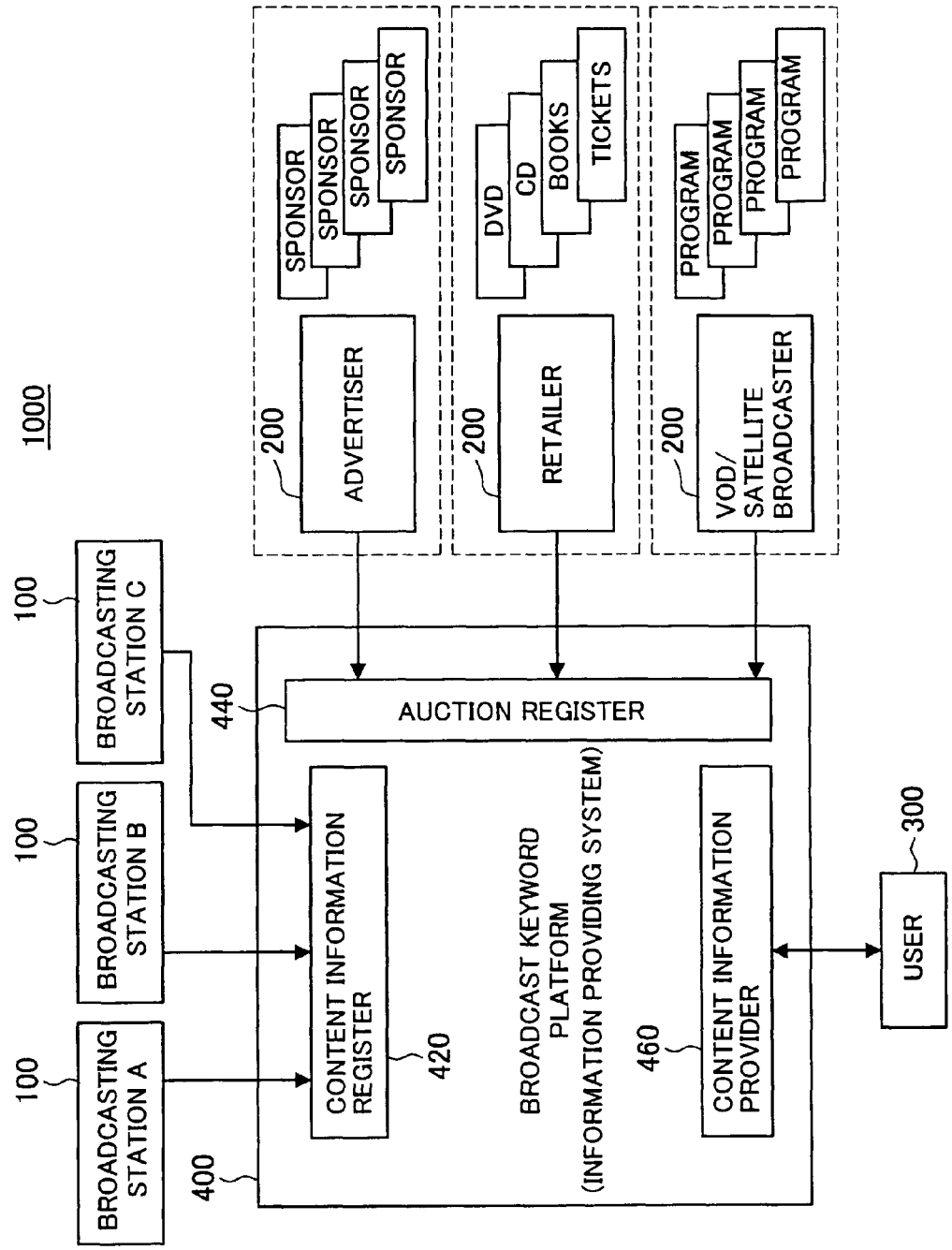
FIG. 1 illustrates the functional structure adopted in the overall system in an embodiment of the present invention.

Hereafter, preferred embodiments of the present invention will be described in detail in reference to appended drawings. Note that, in this specification and the appended drawings, structural elements that have substantially the same function and structure are denoted with the same reference numerals and repeated explanation of these structural elements is omitted.

An Embodiment of the Present Invention

Before an information providing system achieved in an embodiment of the present invention is described in detail, the overall embodiment is briefly outlined so as to facilitate a clear understanding of the technology achieved in the embodiment.

(Overview of the Embodiment)

By adopting the embodiment, advertisement information matching the taste/interest of a specific user (viewer) may be provided based upon keywords contained in content information. Moreover, "front keywords" and "back keywords" are set as keywords to be contained in content information and as these two types of keywords are used in relation to each other, advertisement information closely matching the taste/interest of the user is provided in the embodiment. As shown below, the number of each keyword described above can be determined properly, so that one front keyword may be selected for use, and one back keyword may be set in relation to the front keyword.

The information providing system achieved in the embodiment represents a system through which advertisement information for use in relation to content to be viewed by a user, which matches the user's taste/interest, is selected based upon keywords contained in content information as part of a content information service provided to the user viewing the content. A content holder that provides content and content information and a sponsor who provides advertisements reach an agreement with regard to a keyword through, for instance, the following procedure so as to provide advertisement information in compliance with the agreement when the keyword is searched by the user.

(1) When producing content information for use in relation to specific content, the content holder assigns a front keyword and an back keyword (advertisement keyword) related to the front keyword to the particular content information. Then, the content holder indicates the content information and the advertisement keyword to sponsors.

(2) The sponsor selects content information and an advertisement keywords that are considered to match advertisement information to be presented by the sponsor and attempts to obtain the desired advertisement keyword through an auction-type transaction. For instance, the sponsor may purchase through an auction transaction a "right to present its advertisement information at the user terminal when the content information is searched" by specifying the content information and the back keyword.

(3) When providing content to the user, the content holder also provides advertisement information extracted from a sponsors' advertisement database based upon the transaction agreement reached as described in (2). At this time, the user conducts a search by using a front keyword appended to content information as a search target. The content holder, in turn, extracts advertisement information provided by a sponsor based upon the back keyword for use in relation to the particular front keyword. Namely, the front keyword represents information reflecting the user's taste/interest. Thus, the advertisement information provided to the user is considered, at least by the content holder and the sponsor, to match the user's taste/interest. It will be obvious that the front keyword added to content intended by the sponsor is used as a primary search target. Thus, an advertisement reflecting the intent of both the user and the sponsor may be provided to the user. It is to be noted that a plurality of users may be clustered based upon user taste/interest information and, in such a case, advertisement information to be presented in correspondence to each cluster may be extracted in advance from the advertisement database.

(Clarification of Terms)

The meanings of the terms used in the description are now clarified. First, the term "content information" refers to information for use in relation to content, and does not refer to the content itself that may be provided as a broadcast program or through video streaming. The content information may include, for instance, the content title, a subtitle, the length of time consumed in content reproduction, the format, a description, a synopsis, the cast and the like. In other words, the content information for specific content is constituted with meta-data used to manage information for use in relation to the particular content. It goes without saying that the user may add his own data as used in correspondence to the type of content or the like to manage the content more effectively. For instance, the content information may include the keywords described earlier. However, in the following description, the individual keywords and the content information are handled as separate entities in order to describe the technologies achieved in the embodiment more clearly.

In addition, the two types of keywords mentioned above are handled as distinctly different types of keywords. Namely, while front keyword are provided to the user, the other type of keywords, i.e., back keywords, set in relation to the front keyword, are not revealed to the user. The back keywords are managed within the information providing system by the content holder. It is to be noted that a plurality of back keywords may be set in correspondence to a single front keyword.

(Clarification of Issues)

The issues to be achieved through the information providing system in the embodiment are briefly rationalized. An information providing system in the related art prompts the user himself to enter a search keyword in order to search for information for use in relation to content such as program information. In addition, it is difficult to provide advertisement information matching the intent of the content holder in correspondence to content-related information. It is also difficult to provide effective advertisement information matching the intent of sponsors by utilizing keywords appended to content to be hit by input search keywords. Sponsors are not solicited with ease by the content holder simply by indicating keywords appended to the content, either. Moreover, there has been significant difficulty in realizing technologies that would enable automatic selection of advertisement information to be set in relation to specific content.

The currently available information providing technologies may be summarized as follows. Today, many different types of audiovisual products, such as broadcast programs, movies and music, widely referred to as content, are produced and widely distributed. Terrestrial broadcasting represents an example of a common distribution mode. In the terrestrial broadcasting mode, broadcast program video is distributed to users who are able to view the video received via antennas connected to their television sets at home. A user may view a specific broadcast program selected by referencing program information provided in the TV/radio guide section of the newspaper. In this case, the program information represents an example of content information and the broadcast program video represents an example of content.

Other examples of content distribution modes include the IPTV (Internet protocol television) services such as digital broadcasting, satellite broadcasting, CATV (cable access television) and communication VOD (video on demand) and commercially available packaged content such as DVDs (digital versatile disks). Such content may be viewed or operated at terminals such as television sets, PCs (personal computers) and portable telephones.

The diversity and complexity with which numerous types of content is offered in various distribution modes as described above may necessitate the user to search for content information for use in relation to specific content he wishes to view. The content holder wants to establish and retain a solid user base by providing optimal content information in relation to the content it offers to users.

It is to be noted that the content information is managed based upon meta-data (e.g., the content information described earlier) appended to content. For instance, the meta-data corresponding to specific content may contain a given keyword to be used to ensure that the particular content is indicated in the results obtained by executing a keyword search, as well as various types of information for use in relation to the details, the producer and the like of the content. The meta-data may be provided from a specific information source or they may be recorded as additional information when the content is recorded. In addition, the meta-data may be traded among content business operators for secondary use. Thus, there is a great deal of expectation placed on further development of optimal technologies through which transaction systems related to meta-data creation and distribution may be configured and application technologies that may be adopted in conjunction with such transaction systems.

As explained in detail below, the information providing system achieved in the embodiment has a function of attaching two types of keywords to content and using these keywords in optimal combination. The function enables the information providing system to provide a user with effective advertisement information likely to fit the user's taste/interest.

(Functional Structure of Information Providing System 400)

Figure 2:
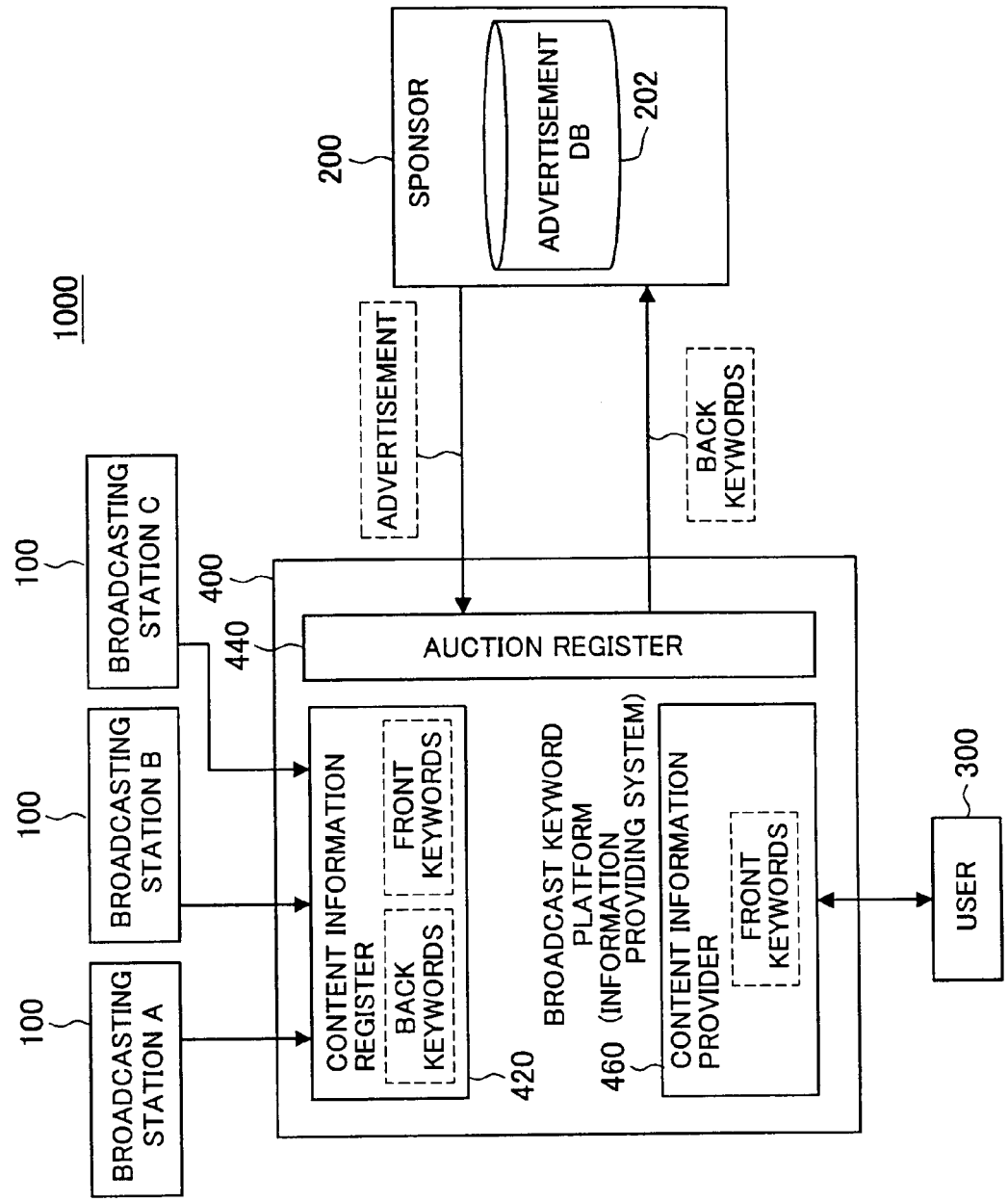
FIG. 2 illustrates the functional structure adopted in the overall system in the embodiment.

In reference to FIGS. 1 and 2, the functional structure adopted in an information providing system 400 achieved in the embodiment is explained. FIG. 1 illustrates the functional structure of the information providing system 400 achieved in the embodiment and FIG. 2 shows in further detail the functional structure adopted in the information providing system 400 in the embodiment. FIGS. 1 and 2 both include structural elements other than the information providing system 400, which operate in relation to the information providing system 400, so as to facilitate the explanation. It is to be noted that the information providing system 400, together with these structural elements, constitutes an overall system 1000.

As shown in FIG. 1, the overall system 1000 includes as its primary structural elements, content holder terminals 100 (e.g., terminals each corresponding to a broadcasting station), sponsor terminals 200 (e.g., terminals corresponding to advertising services, retail services, and VOD/satellite broadcasting services), a user terminal 300 and the information providing system 400 (e.g., a broadcast keyword platform).

(Content Holder Terminals 100)

As shown in FIG. 1, the content holder terminals 100 may be terminal devices each corresponding to a specific broadcasting station that broadcasts television programs. Alternatively, a content holder terminal 100 may belong to a content provider that provides an IPTV service such as digital broadcasting, satellite broadcasting, CATV or communication VOD. Namely, a content holder terminal 100 is equivalent to a main distributing element that distributes content that is enjoyed by users, e.g., broadcast programs, movies or music.

(Sponsor Terminals 200)

As shown in FIG. 1, a sponsor terminal 200 is equivalent to an information provider element that provides users with advertisement information, retail information, program information or the like. A given sponsor terminal 200 may provide, for instance, advertisement information used as introduction to products, services and the like offered by the sponsor. Another sponsor terminal 200 may operate in correspondence to a main retail element that sells goods such as DVD/CD packages, books and tickets and provide advertisement information for use in relation to these commercially available goods. A sponsor terminal 200 may be run by a broadcast business operator that provides programs through VOD/satellite broadcast and, in such a case, advertisement information for use in relation to the programs and the like is provided to users through the sponsor terminal. It is to be noted that the sponsor terminals 200 are each equipped with an advertisement database (DB) 202 having stored therein the advertisement information, as shown in FIG. 2.

(User Terminal 300)

The user terminal 300 in FIG. 1 is a terminal device belonging to a user, through which the user views/listens to content. The user terminal 300 is a viewing terminal, such as a television set, a PC or a portable information terminal at which content can be reproduced. In addition to the reproduced content, a related menu may be brought up on display at the viewing terminal. The menu may be, for instance, a content information providing service screen. If the viewing terminal is, for instance, a digital television set, the menu will be operated through a remote controller. For instance, the remote controller for a given television set may include up/down/left/right buttons and four color keys. Or the menu may be operated through a remote controller with a greater number of keys, e.g., an all-purpose game console controller or a PC keyboard. It is to be noted that color keys each assuming a specific color allows the user to visually verify a selection target and are thus very convenient. Thus, it is desirable that the remote controller include color keys. The use of such color keys eliminates the need for the user to adjust the focus and then operate the execution key and, as a result, a specific button may be selected through a single key operation (i.e. single action).

(Information Providing System 400)

As shown in FIGS. 1 and 2, the information providing system 400 includes as its main structural elements, an information registration unit (content information register) 420, an advertisement registration unit (auction register) 440 and an information providing unit (content information provider) 460.

(Information Providing Unit 460)

The information providing unit 460 provides a user with advertisement information based upon front keywords used to search for information for use in relation to the content to be provided to the user and back keywords set in relation to the front keywords. The information providing unit 460 provides the advertisement information together with content information to the user. Moreover, although not shown, the information providing unit 460 includes as its main structural elements, a display control unit and an advertisement providing unit. The display control unit brings up on display at the user terminal front keywords and keyword buttons to be operated to select front keywords. The advertisement providing unit receives a front keyword selected by operating a keyword button from the user terminal and provides to the user terminal 300 advertisement information selected by an advertisement selection unit included in the advertisement registration unit 440 to be detailed later in correspondence to a back keyword registered in relation to the front keyword. In addition, the information providing unit 460 offers a content information providing service to the user terminal 300. Through this content information providing service, the content information is provided to the user and content information providing services offered at a plurality of content holder terminals 100 may be provided in a bundle. For instance, if the information providing unit 460 serves content holder terminals 100 belonging to broadcasting business operators, the information providing unit 460 may offer content information in correspondence to all the television channels that can be received at television sets as a bundle to the user terminal 300.

(Advertisement Registration Unit 440)

The advertisement registration unit 440 determines advertisement information to be set in relation to a back keyword through, for instance, an auction transaction. Moreover, although not shown, the advertisement registration unit 440 includes, as its main structural elements, an advertisement selection unit and an advertisement registration unit. The advertisement selection unit selects advertisement information to be set in relation to each keyword based upon bidding information corresponding to the back keyword, obtained from sponsor terminals providing advertisement information. The advertisement registration unit then registers the advertisement information having been selected by the advertisement selection unit.

The auction transaction mentioned above is now explained. The advertisement registration unit 440 first allows content information and back keywords set in relation to the content information to be registered by a content holder terminal 100. Next, the advertisement registration unit 440 provides the content information and the back keywords having been registered, to the sponsor terminals 200. In this situation, the advertisement registration unit 440 starts accepting bids from sponsor terminals 200 in correspondence to the back keywords as soon as the content information and the back keywords are registered at a predetermined time. Namely, the advertisement registration unit 440 starts an auction transaction, inviting bids for the back keywords set in relation to the content information which, in turn, is used as reference information. A sponsor, in turn, selects specific content information and a back keyword likely to fit well with its advertising strategy and registers a bid for the back keyword via its sponsor terminal 200. After the auction transaction had progressed for a predetermined length of time, the advertisement registration unit 440 ends the auction transaction for the back keyword and verifies the bidding results. The content holder verifies sponsors having tendered bids for the back keyword by checking the bidding results and selects advertisement information for use in relation to the back keywords via its content holder terminal 100. In other words, the content holder determines the sponsor whose advertisement information is to be used. After the sponsors are determined in correspondence to the individual back keywords, the advertisement registration unit 440 reports the bidding results to the successful bidders, i.e., the sponsors with the advertisement information to be set in relation to the back keywords.

(Information Registration Unit 420)

The information registration unit 420 correlates the front keyword and the back keywords to a specific content. Moreover, although not shown, the information registration unit 420 includes as its main structural elements and front keyword registration unit, a back keyword registration unit and an advertisement information registration unit. The front keyword registration unit registers and front keyword for use in relation to a specific content. The back keyword registration unit registers a back keyword for use in relation to the front keyword. The advertisement information registration unit obtains advertisement information having been registered by the advertisement registration unit and sets the obtained advertisement information in relation to the back keyword. The information registration unit 420 also offers a content information registration service through which content information can be registered at content holder terminals 100. This content information registration service may be provided by the information registration unit 420 having installed therein a content information database and a content registration application.

(Information Providing Method Adopted in the Overall System 1000)

In reference to FIG. 2, the information providing method adopted in the overall system 1000 is briefly explained. A content holder creates content information describing the details of content to be provided by engaging its content holder terminal 100 in operation. The content information thus created includes information indicating, for instance, the title of the content, an overview, the cast, the genre, keywords, the broadcasting date/time, the broadcasting duration, the channel number and the like. In addition, two types of keywords are set at the content holder terminal 100 while creating the content information. The content holder terminal 100 first sets a front keyword to be used as a search target when the user conducts a content information search via his user terminal 300.

It is to be noted that the front keyword may be directly displayed at the user terminal 300 used to play content. For instance, the front keyword may be displayed together with the content information at the display screen at the user terminal 300. In addition, as the user specifies the front keyword displayed at the user terminal 300 used to play the particular content, advertisement information matching the user's taste/interest is provided to the user. This specification processing may be executed by, for instance, specifying a keyword button corresponding to the particular front keyword with a mouse pointer and then clicking a button on the mouse or the like. However, it will be obvious that the keyword button may be specified via a button included on an operation device (e.g., a remote controller) with which the terminal device can be operated or it may be specified by using another type of operation device matching the specific mode adopted in the terminal device.

It is to be noted that a single set of advertisement information or a plurality of sets of advertisement information may be brought up on display at the user terminal 300. For instance, the number of sets of advertisement information to be brought up on display may be regulated in correspondence to the size, the shape or the like of the display area at the user terminal 300. A plurality of sets of advertisement information may be ranked to indicate their priority levels and advertisement information may be selected for display in the order matching the priority rankings. In addition, a list of a plurality of sets of advertisement information may be displayed. In such a case, a list of advertisement information overviews may be brought up on display and as a specific item in the list is selected, the selected advertisement information may be displayed in detail. As an alternative, a plurality of sets of advertisement information may be displayed in sequence. For instance, they may be brought up on display sequentially, starting with the advertisement information with the highest priority ranking.

After checking the advertisement information, the user is able to switch back to the display of the content such as a broadcast program that the user was watching before the advertisement information display. At the user terminal 300, operation buttons such as "next" and "previous" to be used for such user operations, may be displayed. In addition, an indicator (e.g., 4/7) indicating the current page position relative to the overall number of pages or indicating the number of remaining pages may be displayed as well. These structural features will enable the user to switch the display screen with ease by operating the operation buttons.

It is to be noted that the advertisement information display operation performed by the user as described above is saved as history information in a storage unit (not shown) installed within the information providing system 400. The history information may be managed in correspondence to each user. For instance, while a given user may utilize a plurality of user terminals 300, the information providing system 400 is able to identify the particular user through user verification executed each time the user uses a user terminal 300. Thus, the history information corresponding to the user can be accumulated in response to advertisement display operations executed at each user terminal 300. The information providing system 400 also executes statistical processing on the accumulated history information and provides information indicating the viewing frequencies with which the individual sets of content is viewed, information indicating the display frequencies with which the individual sets of advertisement information are viewed, and the like to the content holder terminals 100 and the sponsor terminals 200. As a result, evaluation information providing clear evaluations of specific types of keywords set in relation to content, specific types of advertisement information for use in relation to keywords and the like, is provided.

In addition, the information providing system 400 executes a search of advertisement information recorded in the advertisement database 202 based upon user taste/interest information and the back keywords. The information providing system 400 then provides extracted advertisement information to the user terminal 300. Thus, advertisement information closely matching the user's taste/interest is provided to the user terminal 300. It will be obvious that the advertisement information is selected in line with the intent of the content holder.

As has already been explained, the content holder creates content information, front keyword and back keywords. At the content holder terminal 100, a plurality of back keywords may be created in correspondence to a single front keyword. After the content information, the front keyword and the back keywords are set in correspondence to specific content via the information registration unit 420, the content holder terminal 100 transmits the content information and the back keywords to the advertisement registration unit 440 in order to set them prior to the auction transaction start.

In response to an operation performed by a sponsor, the corresponding sponsor terminal 200 accesses the advertisement registration unit 440 to search for content information and the back keywords set in relation to the content information, which will best suit the advertising strategy of the particular sponsor and thus selects a desired back keyword. Subsequently, as the registration period, during which the content information and the back keywords for use in relation to the content information are registered at the advertisement registration unit 440 ends, the content holder terminal 100 ascertains each sponsor having selected the particular content information and back keywords in response to an operation performed by the content holder. Then, the content holder and the sponsor conclude a transaction agreement pertaining to the inclusion of the advertisement information.

The flow of the processing executed by adopting the information providing method in the overall system 1000 has been briefly explained above. The individual functions explained above are fulfilled by various structural elements of the information providing system 400. The individual structural elements share or sequentially transmit/receive the front keyword, the back keywords, the content information or the content itself while executing the various phases of the processing. As a result, the user is able to view advertisement information for use in relation to the content information at the user terminal 300 used for playing content. In addition, the advertisement information can be viewed through a simple remote controller operation. Furthermore, if the advertisement information is retail information, the user is able to purchase a product advertised in the advertisement information or if a new movie is introduced in the advertisement information, the user is able to purchase the movie in a DVD package, as well as simply viewing the advertisement information.

Furthermore, if a pay-per-view program is advertised in the advertisement information, the user is able to purchase or reserve a program offered on the pay channel. The information providing system 400 thus greatly improves the user convenience. At the same time, the content holder is able to earn revenue from advertising fees by selling keywords attached to content information to sponsors. Moreover, the content holder is able to control the type of advertisement information to be presented in relation to content in line with its intent/policy via its content holder terminal 100. Furthermore, it is able to check the advertising effect by statistically processing information indicating the viewing statuses at individual user terminals 300. The information providing method provides obvious advantages for sponsors as well in that they can provide advertisement information to clearly targeted users and in that they can verify the advertising effect.

(Overview of ECG Services)

In the explanation provided above on the functional structure adopted in the information providing system 400, which constitutes part of the overall system 1000, two different types of keywords, i.e., front keyword, directly provided to user terminals 300 to be used when the users search for information for use in relation to currently viewed content and back keywords set in relation to the front keyword, which remain hidden at the user terminals 300, have been described. The service through which information such as advertisement information is provided through the use of two different types of keywords as described above may be referred to as electronic content guide (ECG) services. The services offered as part of the ECG services are now briefly described in reference to FIG. 3.

Figure 3:
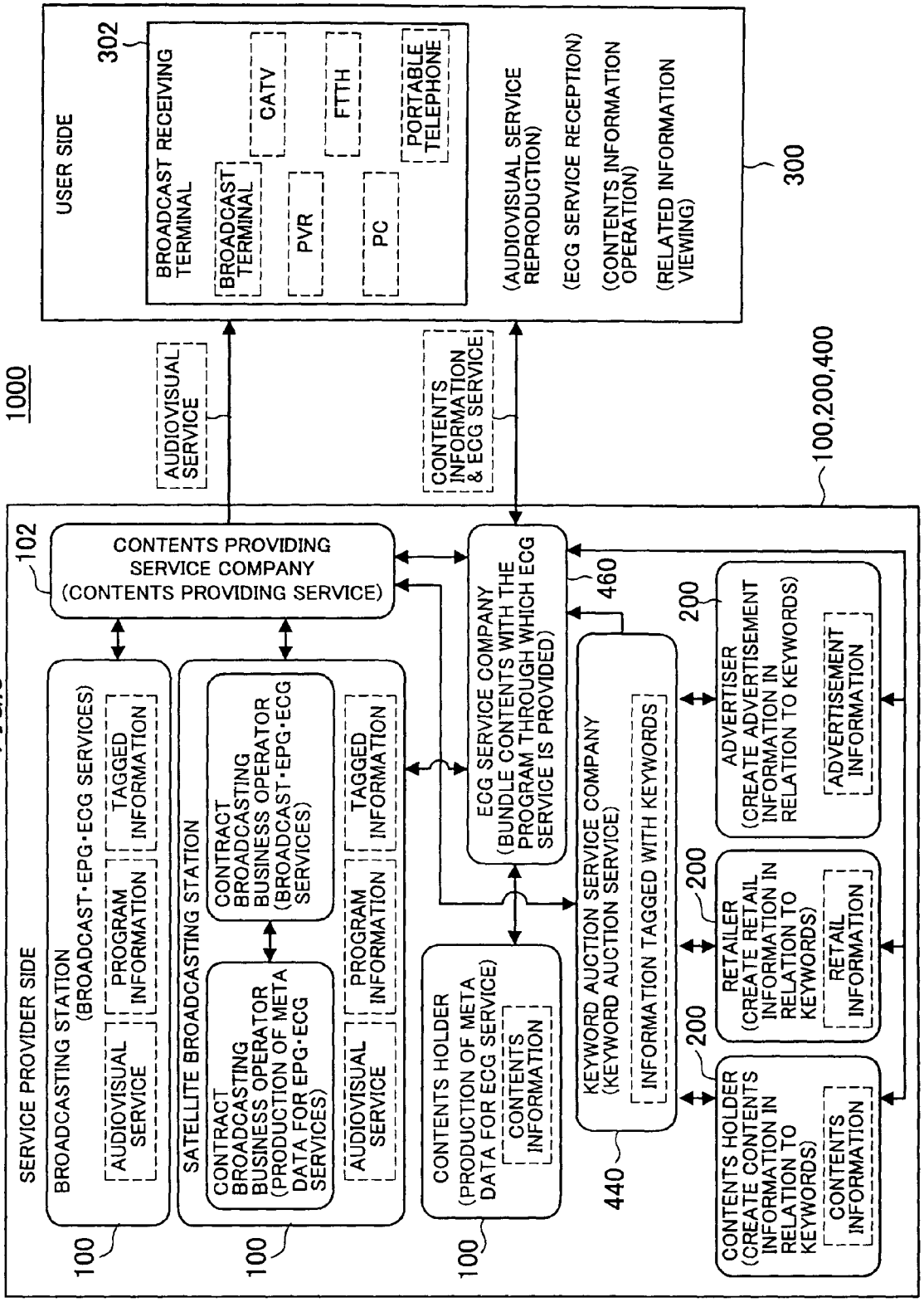
FIG. 3 illustrates the functional structure adopted in the overall system in the embodiment.

FIG. 3 indicates that the two major parts constituting the overall system 1000 are the service provider side and the user side. The service provider side includes, as its primary structural elements, the content holder terminals 100, the sponsor terminals 200 and the information providing system 400. The user side, on the other hand, is constituted with individual user terminals 300. Content services through which content such as video or audio data are provided to the user side are offered by the service provider side. At the same time, the service provider side provides content information for use in relation to content to be offered to the user side and the ECG services. As a result, the user side is able to search with ease for information for use in relation to specific content as well as play the content via a specific terminal device.

The user side is first explained. As shown in FIG. 3, the user side includes a broadcast receiving terminal 302 functioning as a terminal device used for content viewing. At the broadcast receiving terminal 302, which may be a broadcast terminal of a television image receiver, a CATV, a PVR (personal video recorder), an FTTH (fiber to the home), a PC or a portable telephone, where video or audio data can be reproduced, the ECG services can be received, content information can be handled or content-related information can be viewed, for instance.

Next, the service provider side is explained. As shown in FIG. 3, a content holder terminal 100 may be, for instance, a broadcasting station or a satellite broadcasting station. A sponsor terminal 200 may be, for instance, another content holder, a retail company or an advertising company. The role of the advertisement registration unit 440 is fulfilled by a keyword auction service agent in the service provider side configuration. The role of the information providing unit 460 is fulfilled by an ECG service company.

A broadcasting station (content holder terminal 100) produces audiovisual services, program information, related information for use in relation to such content and the like, which are to be provided through broadcasting EPG (electronic program guide) ECG services. A satellite broadcasting station (content holder terminal 100) hires a contract broadcast business operator that produces method data to be used in EPG ECG services and a contract broadcast business operator that provides broadcasting EPG ECG services to produce audiovisual services, program information, related information for use in relation to such content and the like on their behalf. Subsequently, the broadcasting station and the satellite broadcasting station each transmit the content and the information for use in relation to the content, having been produced, to a content providing service company 102. The content providing service company 102 offers services through which content such as audiovisual products are distributed to the user side.

A sponsor terminal 200 may be, for instance, another content holder, a retail company or an advertising company. In response to an operation performed by the sponsor, advertisement information to be set in relation to back keywords is created at the sponsor terminal 200. If the sponsor is a content holder, content information for use in relation to the content to be provided is created as the advertisement information. If, on the other hand, the sponsor terminal 200 is operated by a retail company, retail information for use in relation to commercial goods offered for sale is created as the advertisement information. If the sponsor terminal 200 is operated by an advertising company, advertisement information to be presented as it on commodity is produced. The sponsor terminal 200 then transmits the advertisement information having been created to the keyword auction service company 440. The keyword auction service company 440 represents a specific example of a means for fulfilling the functions of the advertisement registration unit 440 mentioned above.

The keyword auction service company 440 executes an auction transaction by accepting bids for target keywords and selects advertisement information to be set in relation to the keywords. For instance, a given sponsor tenders a bid for a specific back keyword for which the keyword auction service company 440 is soliciting bids by indicating the advertisement information that the bidder wishes to set in relation to the back keyword and the amount of money offered in the bid. The keyword auction service company 440 accepts bids tendered for the back keyword over a predetermined length of time and then ends the bidding period. Subsequently, it processes the information having been provided by the bidders as statistical data. For instance, the keyword auction service company 440 may create ranking information based upon the amounts of money offered in the individual bids tendered for the back keyword. Such ranking information may include sets of information arranged in an order matching the amounts of money offered in the bids, each indicating the bidding target back keyword, the name of the bidding sponsor and the amount of money offered in the bid by the sponsor. Based upon the ranking information, advertisement information to be presented in relation to the specific back keyword will then be selected. It is to be noted that content information or back keywords for which the keyword auction service company 440 solicits bids may have been created at content holder terminals 100 or they may have been provided via the content providing service company 102.

As the advertisement information for use in relation to the individual back keywords is selected as described above, correlation information indicating the correlation between the back keywords and the advertisement information is transmitted to the content providing service company 102 or the ECG service company 460. The ECG service company 460, which represents a specific example of a means for fulfilling the functions of the information providing unit 460, sets content in relation to programs through which ECG services are to be offered. The content information used when offering the ECG services is provided from the content holder terminal 100. The ECG service company 460 provides the ECG services as it delivers the content information to the user side. As part of the ECG services offered at this time, the advertisement information is provided based upon the correlation information described above.

While the processing flow through which the ECG services are provided has been explained by referring to a specific example above, the configuration shown in FIG. 3 simply represents an example and the present invention may be adopted in any of various other configurations. In addition, while some corporate organizations are described as structural elements in order to facilitate better understanding of the concept, such a configuration simply represents a model, and the flow is actually realized through the functions of the information registration unit 420, the advertisement registration unit 440 and the information providing unit 460 mentioned earlier. Accordingly, the explanation is given above by using common reference numerals to clearly indicate their correspondence.

(Structure Adopted in the Broadcast Receiving Terminal 302)

Figure 4:
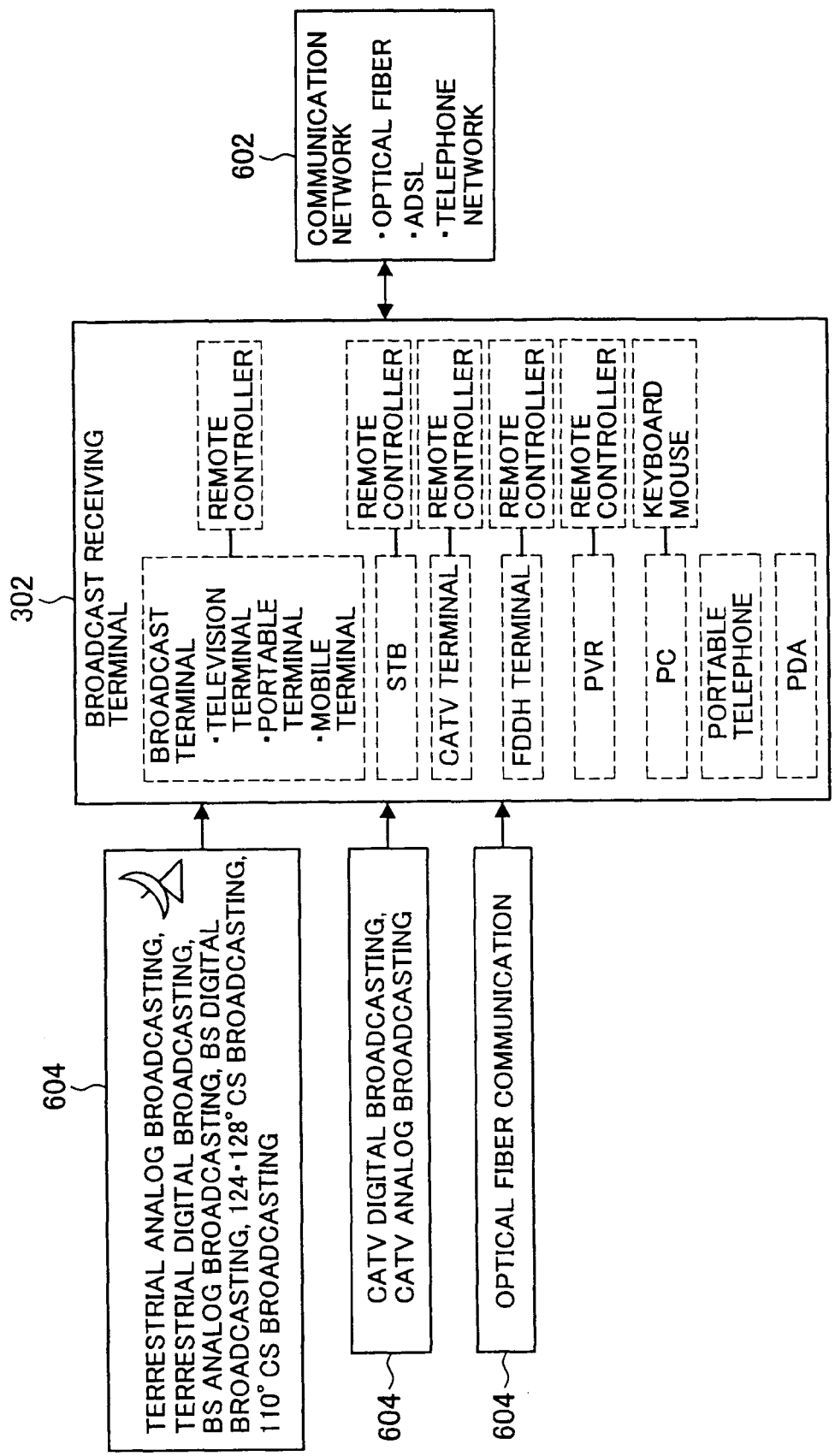
FIG. 4 illustrates the functional structure adopted in a broadcast receiving terminal in the embodiment.

Next, in reference to FIG. 4, the structure adopted at the broadcast receiving terminal 302 is briefly explained. FIG. 4 illustrates the structure of the broadcast receiving terminal 302.

As shown in FIG. 4, the broadcast receiving terminal 302 may be, for instance, a broadcast terminal, an STB (set top box), a CATV terminal, a FDDH terminal, a PVR, a PC, a portable telephone or a PDA. The broadcast terminal may be, for instance, a television terminal, a portable terminal, a mobile terminal or the like. In addition, the broadcast terminal, the STB, the CATV terminal, the FDDH terminal and the PVR each include a remote controller to enable operation of the corresponding device. Also, a keyboard and mouse are provided in conjunction with the PC to enable operation of the PC. The broadcast receiving terminal 302 may be connected with a communication network 602. The communication network 602 may be, for instance, an optical fiber network, an ADSL network, a satellite communication network or a telephone network. Through the communication network 602, the broadcast receiving terminal 302 can be further connected to a network such as the internet or an intranet, so as to receive content information and the like from a server unit operating on the network.

The broadcast receiving terminal 302 is also connected to an information distribution device 604 that distributes content or content information. The information distribution device 604 may be a device that provides broadcast programs or information on programs offered through terrestrial analogue broadcasting, terrestrial digital broadcasting, BS analogue broadcasting, BS digital broadcasting, 124·128° CS broadcasting or 110° CS broadcasting. Alternatively, the information distribution device 604 may be a device that provides broadcast programs or information on programs offered through CATV digital broadcasting or CATV analogue broadcasting. Furthermore, the information distribution device 604 may be a device that distributes content or content information through optical fiber communication. The broadcast receiving terminal 302 is connected to the information distribution device 604 in a mode matching the type of information distribution device 604.

As explained above, the broadcast receiving terminal 302 is allowed to assume any of various modes and there are no restrictions with regard to the types of content it may receive or the distribution method. It is to be noted that the broadcast receiving terminal 302 represents an example of a user terminal 300 through which the user is able to subscribe to ECG services.

(Structure Adopted in the Information Distribution Device 604)

Figure 5:
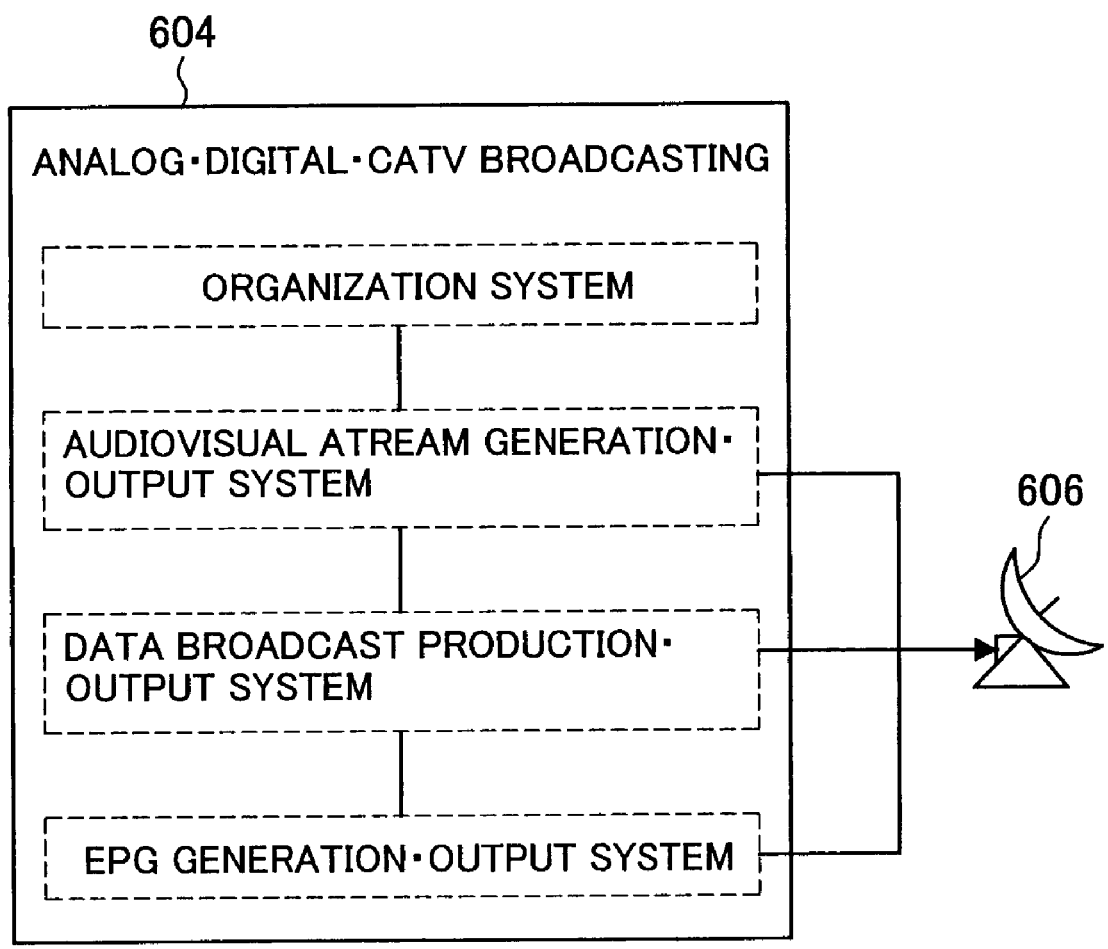
FIG. 5 illustrates the functional structure adopted in the information distribution unit.
Figure 6:
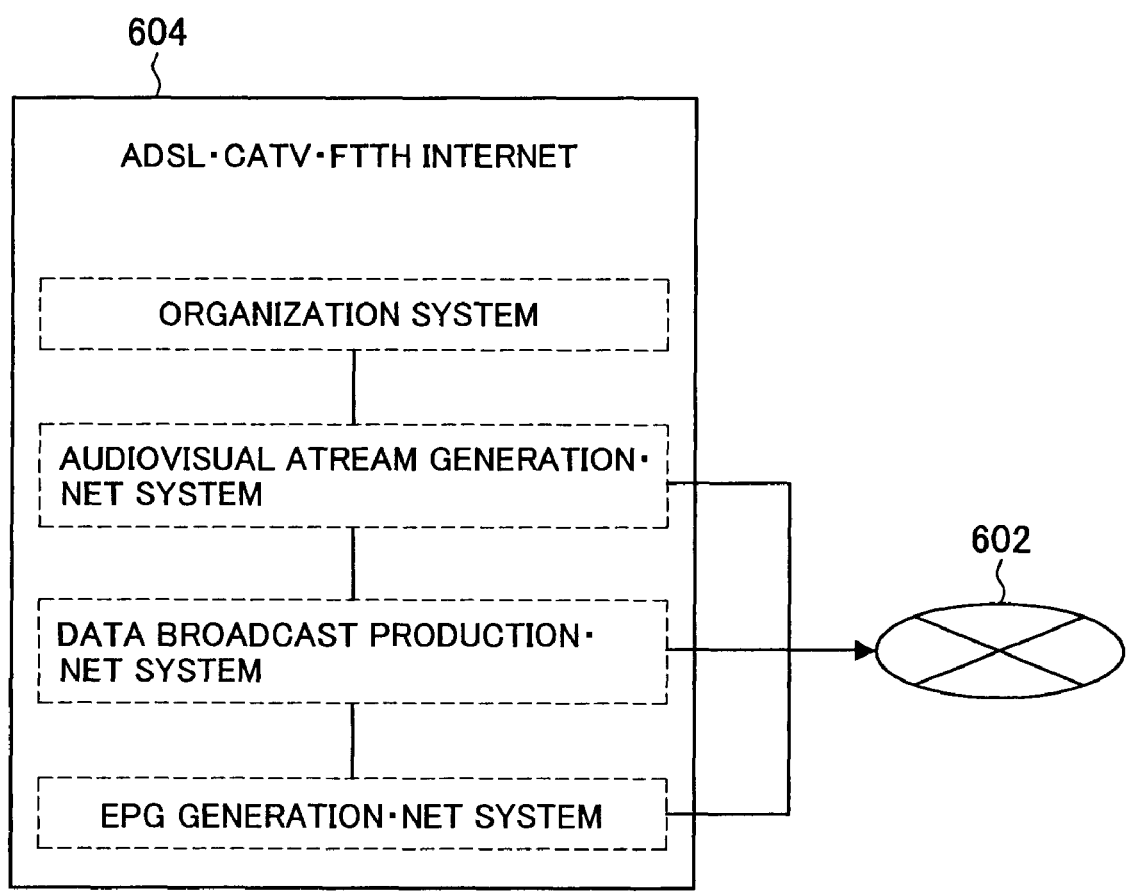
FIG. 6 illustrates a functional structure adopted in the information distribution unit.

Next, the structure adopted in the information distribution device 604 is explained in further detail. FIGS. 5 and 6 illustrate functional structures that may be adopted in the information distribution device 604.

FIG. 5 presents a structural example that may be adopted in an information distribution device 604 capable of distributing broadcast programs, information on programs and the like, offered through analogue broadcasting, digital broadcasting or CATV broadcasting. This information distribution device 604 organizes programs by using a organization system and then generates a video stream and an audio stream by using a video•audio stream generation•output system. In addition, the information distribution device 604 produces broadcast data by using a data broadcast production•output system and generates EPG information by using an EPG generation•output system. Then, the information distribution device 604 transmits the video•audio streams, the broadcast data, and the EPG information having been thus generated to the broadcast receiving terminal 302 via a broadcast antenna 606.

FIG. 6 presents a structural example that may be adopted in an information distribution device 604 capable of distributing content and content information via ADSL, CATV, FTTH, the Internet or the like. This information distribution device 604 organizes programs by using a organization system and then generates a video stream and an audio stream by using of a video•audio stream generation•net system. In addition, the information distribution device 604 produces broadcast data by using a data broadcast production output system and generates EPG information by using an EPG generation net system. Then, the information distribution device 604 transmits the video audio streams, the broadcast data, and the EPG information having been thus generated to the broadcast receiving terminal 302 via the communication network 602.

(Detailed Description of the Structure Adopted in the Broadcast Receiving Terminal 302)

Figure 7:
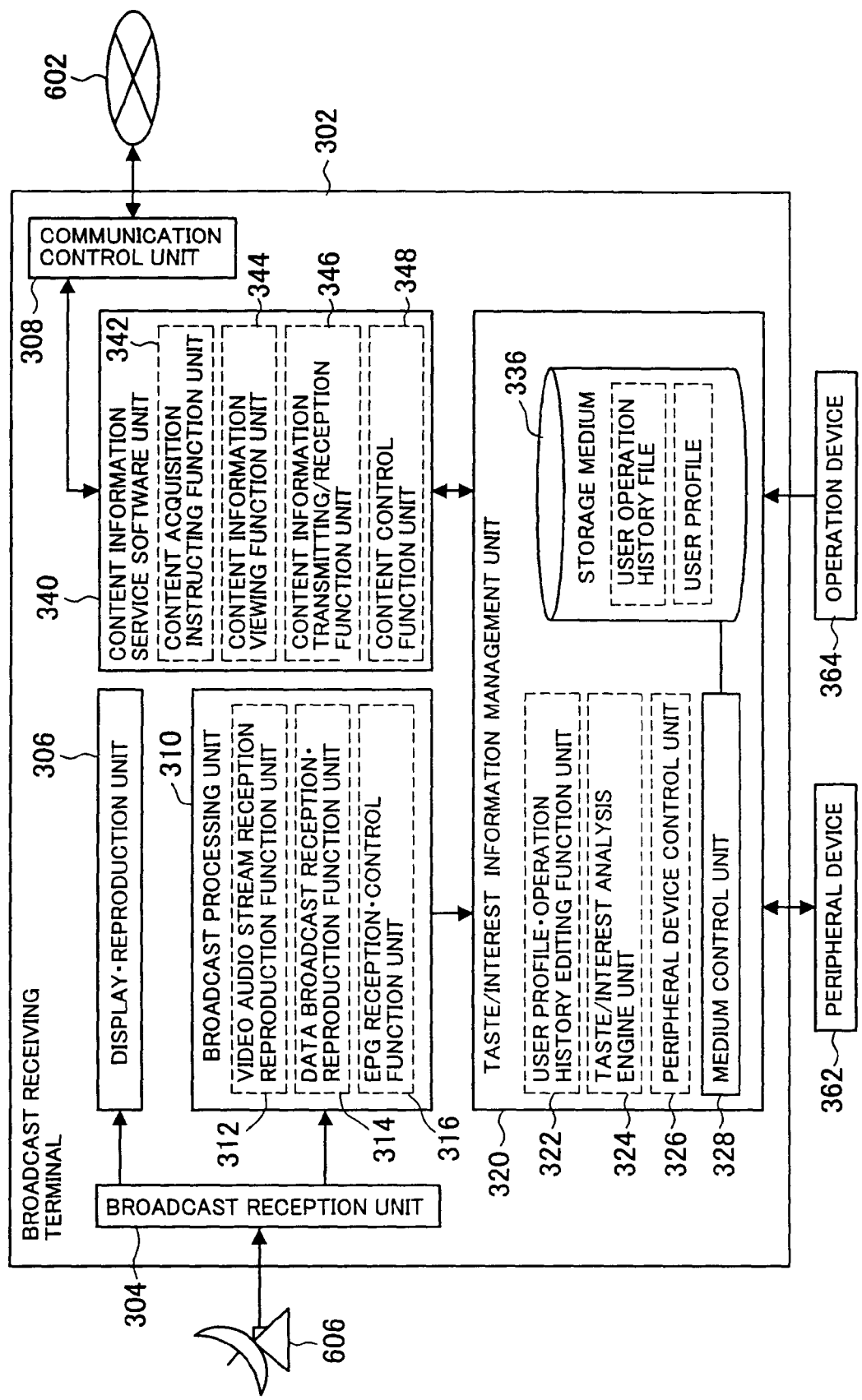
FIG. 7 illustrates the functional structure adopted in the broadcast receiving terminal achieved in an embodiment of the present invention.

Next, in reference to FIG. 7, the structure of the broadcast receiving terminal 302 is explained in further detail. FIG. 7 illustrates the functional structure adopted in the broadcast receiving terminal 302.

As shown in FIG. 7, the broadcast receiving terminal 302 includes as its primary structural elements, a broadcast reception unit 304, a display•reproduction unit 306, a broadcast processing unit 310, a taste/interest information management unit 320, a content information service software unit 340 and a communication control unit 308.

The broadcast reception unit 304 receives program content, program information and the like through, for instance, the broadcast antenna 606. The display•reproduction unit 306 displays, for instance, program content or program information having been received via the broadcast reception unit 304 or content or content information having been received through another communication path. The communication control unit 308 receives content, content information or other types of information via, for instance, the communication network 602 which may be the internet.

(Broadcast Processing Unit 310)

As shown in FIG. 7, the broadcast processing unit 310 includes, as its primary structural elements, a video•audio stream reception•reproduction function unit 312, a data broadcast reception•reproduction function unit 314 and an EPG reception•control function unit 316. The video•audio stream reception•reproduction function unit 312 fulfills functions of, for instance, receiving video information through a video stream and an audio stream and reproducing the received video information. The data broadcast reception•reproduction function unit 314 fulfills functions of receiving broadcast data provided through data broadcasting and reproducing the received broadcast data. The EPG reception•control function unit 316 fulfills functions of receiving, for instance, EPG data such as program time table data and controlling the received EPG data. It is to be noted that the various structural elements in the broadcast processing unit 310 may be allowed to exchange various types of information with one another or they may adopt structures that will allow information held at a given structural element to be utilized by another structural element with ease.

(Taste/Interest Information Management Unit 320)

As shown in FIG. 7, the taste/interest information management unit 320 includes, as its main elements a user profile•operation history editing function unit 322, a taste/interest analysis engine unit 324, a peripheral device control unit 326, a media control unit 328 and a storage medium 336. It is to be noted that the taste/interest information management unit 320 is connected to an operation device 364 such as a remote controller, so as to allow the operations of the individual structural elements constituting the taste/interest information management unit 320 to be controlled via the operation device 364. Such an operation device 364 may be, for instance, a remote controller, a keyboard, a mouse, a touch panel, a portable telephone, a PDA or any other portable information terminal. It is to be noted that the various structural elements in the taste/interest information management unit 320 may be allowed to exchange various types of information with one another or they may adopt structures that will allow information held at a given structural element to be utilized by another structural element with ease.

The user profile•operation history editing function unit 322 fulfills a function of editing information for use in relation to the user such as the user profile and operation history. The taste/interest analysis engine unit 324 has a function of analyzing the user's taste/interest by using the information such as the user profile or the operation history obtained through the user profile•operation history editing function unit 322 and generating taste/interest information corresponding to the specific user. The media control unit 328 has functions of controlling a recording function of the storage medium 336 and inputting/outputting various types of information to/from the storage medium 336. The media control unit 328 also controls operations of a peripheral device 362 which is an external device connected thereto, such as a storage device, a reproduction device, a printer, a communication device, a disk reader or a remote controller. Alternatively, the media control unit 328 may control the operations of the individual structural elements constituting the taste/interest information management unit 320 by reading control instructions received from the peripheral device 362. The storage medium 336 has stored therein information such as user operation history files, or user profiles.

(Content Information Service Software Unit 340)

As shown in FIG. 7, the content information service software unit 340 includes, as its primary structural elements, a content acquisition instructing function unit 342, a content information viewing function unit 344, a content information transmission/reception function unit 346 and a content control function unit 348. It is to be noted that the various structural elements in the content information service software unit 340 may be allowed to exchange various types of information with one another or they may adopt structures that will allow information held at a given structural element to be utilized by another structural element with ease.

The content acquisition instructing function unit 342 issues an instruction for, for instance, the communication control unit 308 to obtain content or content information for viewing. The content information viewing function unit 344 has a function of reading content information. The content information transmission/reception function unit 346 fulfills functions of taking in content or content information having been received from the communication network 602 via the communication control unit 308 and transmitting content, content information or another type of related information via the communication control unit 308. The content control function unit 348 controls the functions through which content or content information is recorded, reproduced, transmitted, received, edited or the like.

As explained above, content or content information can be received from a content distribution terminal such as the information distribution device 604 and the content or the content information thus received can be reproduced at the broadcast receiving terminal 302. Furthermore, user information indicating types of content having been reproduced, the operation history and the like can be accumulated in correspondence to the specific user profile and the taste/interest information obtained by analyzing the user information can be managed at the broadcast receiving terminal 302. It is to be noted that such taste/interest information may be transmitted to another user terminal, a sponsor terminal 200, a content holder terminal 100 or the like via, for instance, the communication network 602. It is to be noted that the various structural elements in the broadcast receiving terminal 302 may be allowed to exchange various types of information with one another or they may adopt structures that will allow information held at a given structural element to be utilized by another structural element with ease.

(Overview: How Content Information is Provided)

Figure 8:
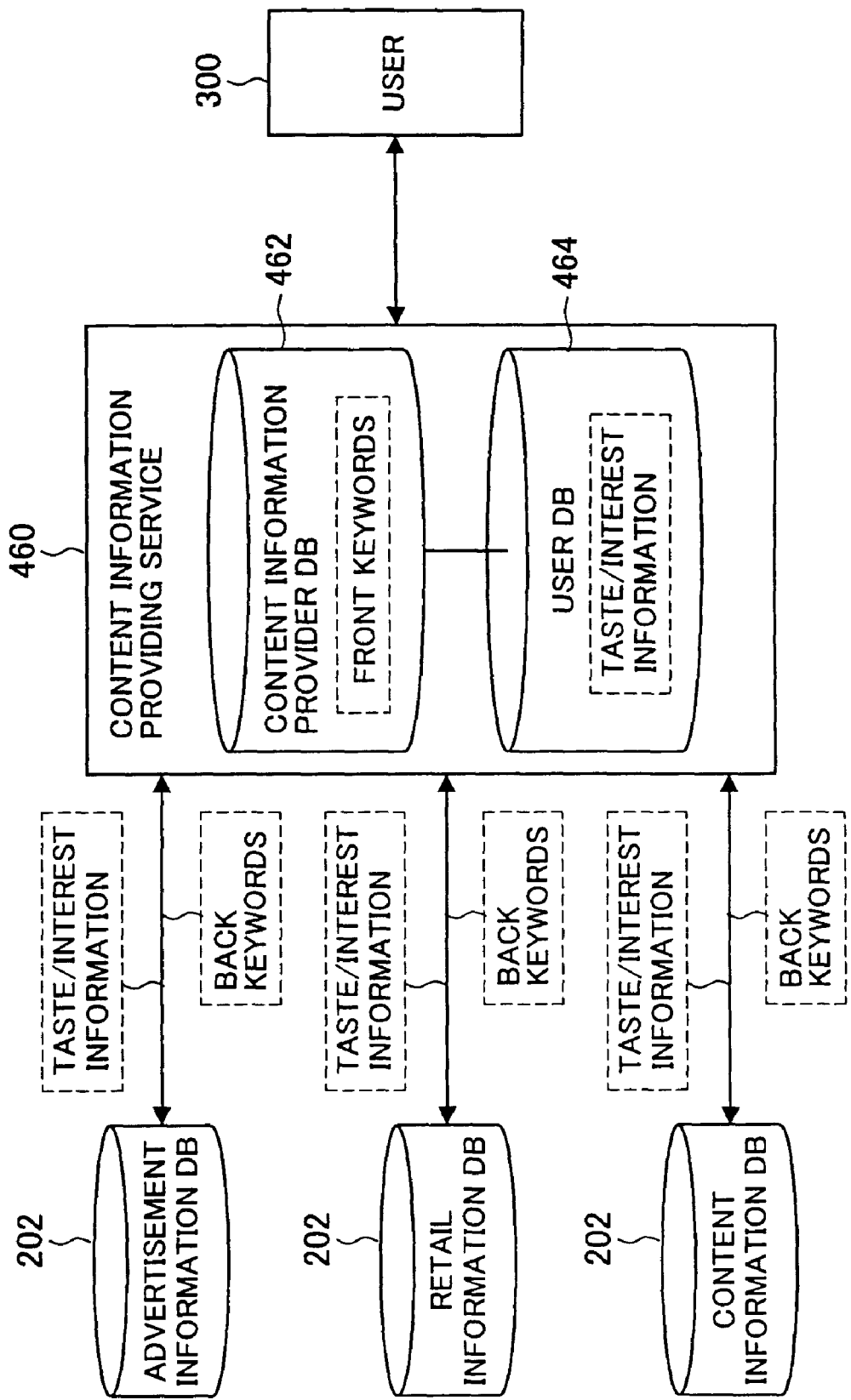
FIG. 8 illustrates the functional structure adopted in the information providing unit in the embodiment.

Next, in reference to FIG. 8, the functional structure adopted in the information providing unit 460 is explained in further detail. FIG. 8 illustrates the structure of the information providing unit 460. In the following explanation, the content information providing services offered through the information providing unit 460 are summarized.

As shown in FIG. 8, the information providing unit 460 includes, as its primary structural elements, a content information provider database 462 and a user database 464. Front keywords, for instance, may be recorded in the content information provider database 462. The user taste/interest information is recorded into the user database 464. The information providing unit 460 records the taste/interest information obtained by executing statistical analysis based upon the types of content having been viewed by each user, the advertisement information selection statuses corresponding to the user and the like into the user DB 464. In addition, the information providing unit 460 records the front keyword set in relation to the individual sets of content into the content information provider DB 462. The information providing unit 460 provides user taste/interest information and back keywords to the sponsor terminals 200. Based upon the taste/interest information and the back keywords obtained from the information providing unit 460, various types of advertisement information are transmitted from the sponsor terminals 200 to the information providing unit 460. It is to be noted that the advertisement information is recorded in various types of advertisement DBs 202 at the individual sponsor terminals 200.

(Content Information Providing Screen)

Figure 9:
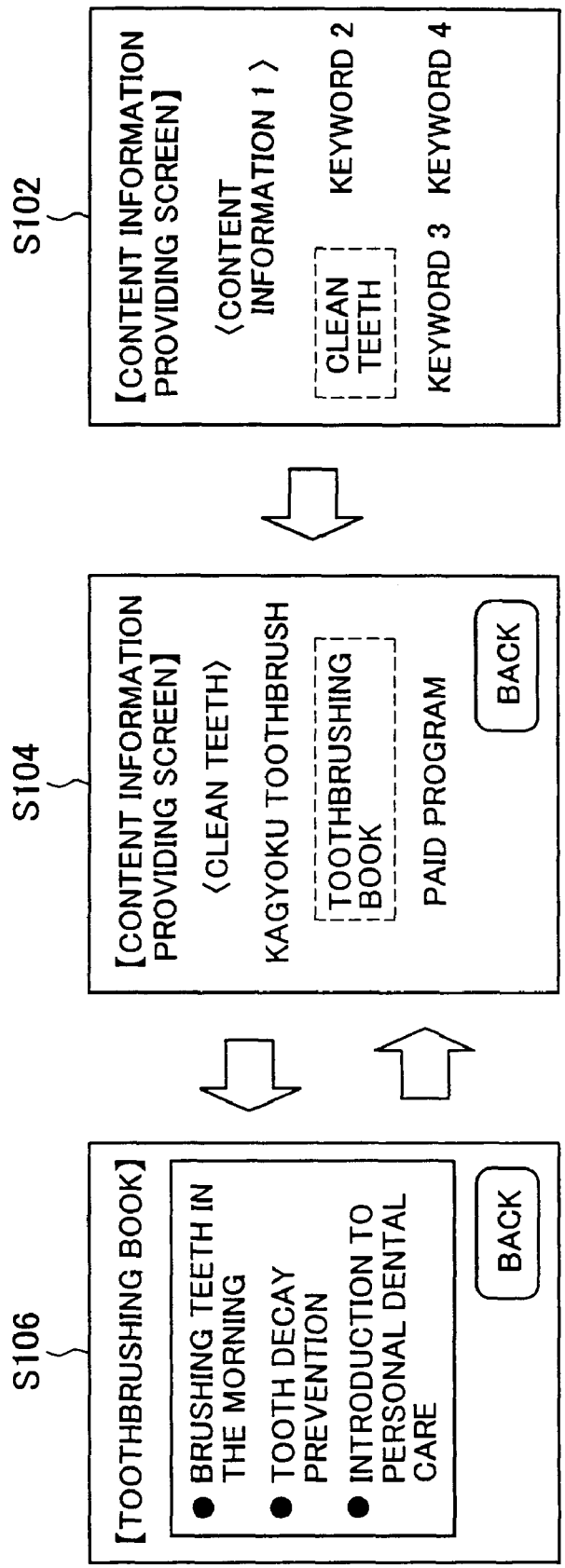
FIG. 9 shows a content information providing screen brought up on display in the embodiment.

Next, in reference to FIG. 9, a specific example of the content information providing screen brought up on display at the user terminal 300 to support the content information providing services is explained. FIG. 9 illustrates content information providing service screen images.

As shown in FIG. 9, a content information providing screen is brought up on display at the user terminal 300 (S102). The content providing screen brought up on display may include front keyword ("clean teeth", "keyword 2" . . . "keyword 4") related to a given set of content information (content information 1). As the front keyword "clean teeth" is selected, the content information providing screen is switched to bring up advertisement information registered in relation to the front keyword "clean teeth" or headings for such advertisement information (S104). If, for instance, the advertisement heading "tooth brushing book" is selected in this situation, the advertisement information for use in relation to the particular heading is brought up on display (S106).

(Overview; How Content Information is Registered)

Figure 10:
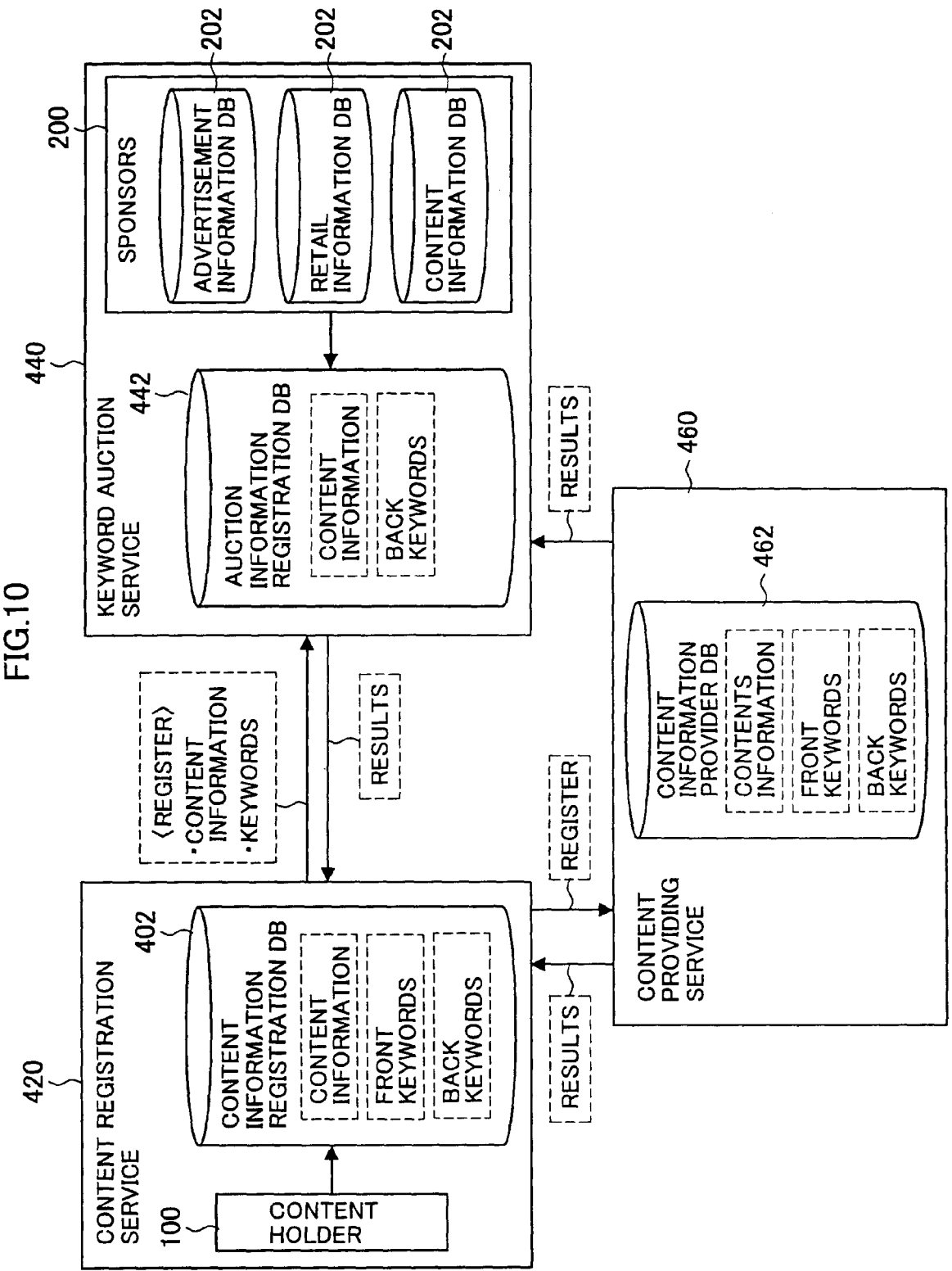
FIG. 10 illustrates the functional structure adopted in the information providing system achieved in the embodiment.

Next, in reference to FIG. 10, the flow of the registration processing executed to register content, content information and advertisement information is explained. FIG. 10 schematically illustrates the content information registration processing.

The information registration unit 420, which provides the content registration service, registers in a content information registration DB 402 content information, front keywords and back keywords having been created by a content holder. In other words, the information registration unit 420 is equipped with the content information registration DB 402. The information registration unit 420 then transmits to the advertisement registration unit 440 the content information and the back keywords having been registered in the content information registration DB 402.

The advertisement registration unit 440, which provides the keyword auction service, first registers the content information and the back keywords having been obtained from the information registration unit 420 in an auction information registration DB 442. Then, the advertisement registration unit 440 discloses the content information and the back keywords to the sponsor terminals 200, thereby inviting the sponsors to tender bids for each of the back keywords through an auction transaction. The sponsors, each equipped with a specific type of advertisement DB 202, select advertisement information that they wish to have set in relation to the disclosed content information and back keywords from their advertisement DBs 202 and tender bids. Each sponsor tendering a bid will have selected a specific bidding target and transmits the advertisement information for use in relation to the bidding target and information indicating the amount of money offered in the bid to the advertisement registration unit 440. The bidding information thus transmitted is stored in the auction information registration DB 442 until the auction transaction ends. As the auction transaction ends, the advertisement registration unit 440 determines a successful bidder by selecting a specific number of highest bidders or based upon a predetermined condition. In other words, advertisement information to be presented in relation to each back keyword is determined. Then, the advertisement registration unit 440 transmits correlation information indicating the advertisement information to be displayed in relation to the back keywords to the information registration unit 420.

Upon obtaining the correlation information, the information registration unit 420 transmits the content information, the front keyword, the back keywords and the correlation information to the information providing unit 460. The information providing unit 460, which provides the content providing service, registers in the content information provider DB 462, the content information, the front keyword, the back keywords and the correlation information having been obtained from the information registration unit 420. Then, based upon the information having been registered in the content information provider DB 462, the information providing unit 460 offers the content providing service to the user terminals 300. In addition, the information providing unit 460 creates statistical information by statistically analyzing access frequencies with which each set of advertisement information is accessed by the user terminals 300 or the like and feeds back this statistical information to the information registration unit 420 and the advertisement registration unit 440. The information registration unit 420, in turn, provides the statistical information having been received to the content holder terminal 100. The advertisement registration unit 440, on the other hand, provides the statistic information having been received to the sponsor terminals 200.

As explained above, the information registration unit 420, the advertisement registration unit 440 and the information providing unit 460 work in cooperation with one another to select advertisement information to be presented in relation to specific content or content information and provides the selected advertisement information together with the content or content information to the user terminal 300.

(Content Information Registration Screen)

Figure 11:
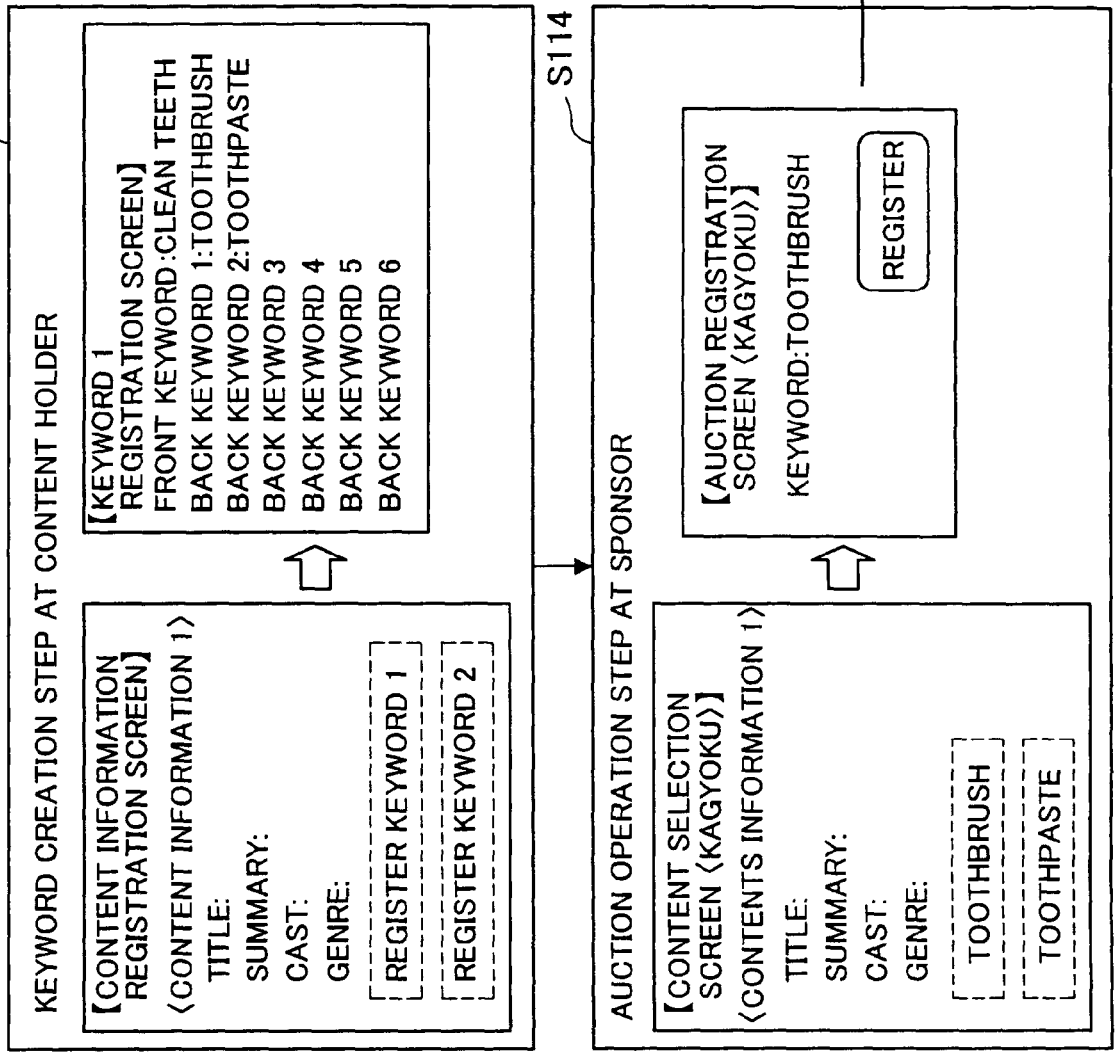
FIG. 11 illustrates the advertisement information registration processing executed in the embodiment.

Next, in reference to FIG. 11, the flow of the registration processing executed to register content information, a front keyword, back keywords and advertisement information for use in relation to them is explained. FIG. 11 schematically illustrates the content information registration processing.

A keyword creation step S112 executed at a content holder, an auction operation step S114 executed at a sponsor and a sponsor verification step S116 executed at the content holder are schematically shown in FIG. 11.

In the keyword creation step S112 executed at the content holder, a content information registration screen is first brought up on display. The content information registration screen may include, for instance, input fields for entering the title, the synopsis, the cast and the genre in correspondence to "content information 1", together with keyword registration buttons to be operated to register keywords in relation to the particular content information. The content holder selects a button "keyword registration 1" to register first keywords in relation to the content information. As the "keyword registration 1" button is selected, a keyword registration 1 screen with input fields for entering a front keyword and a plurality of back keywords is brought up on display. At this point, the content holder sets a front keyword and at least one back keyword.

Next, in the auction operation step S114 executed by the sponsor, a content selection screen is brought up on display. Assuming that two back keywords ("toothbrush" and "toothpaste") have been set in correspondence to content information 1 and that the sponsor (bearing a specific "tooth paste manufacturer name") has selected the back keyword "toothbrush", the "toothbrush" and the "toothpaste manufacturer name" are registered in the auction information registration DB 442 as correlation candidates. Although not shown, a bidding offer screen may be brought up on display at this time to enable entry of a specific amount of money to be offered as a bid. In such a case, the amount of money offered in the bid, too, is registered.

Next, in the sponsor verification step S116 executed by the content holder, an auction results screen is brought up on display. If a plurality of bids have been tendered for the back keywords "toothbrush" and "toothpaste" set in relation to content information 1, a ranking display of the bidders' names ranked in correspondence to the amounts of money offered in their beds or the like is brought up on display as shown in FIG. 11 so as to ensure that the content holder is able to easily identify the sponsors having tendered bids.

(Overview; Bidding Results Report)

Figure 12:
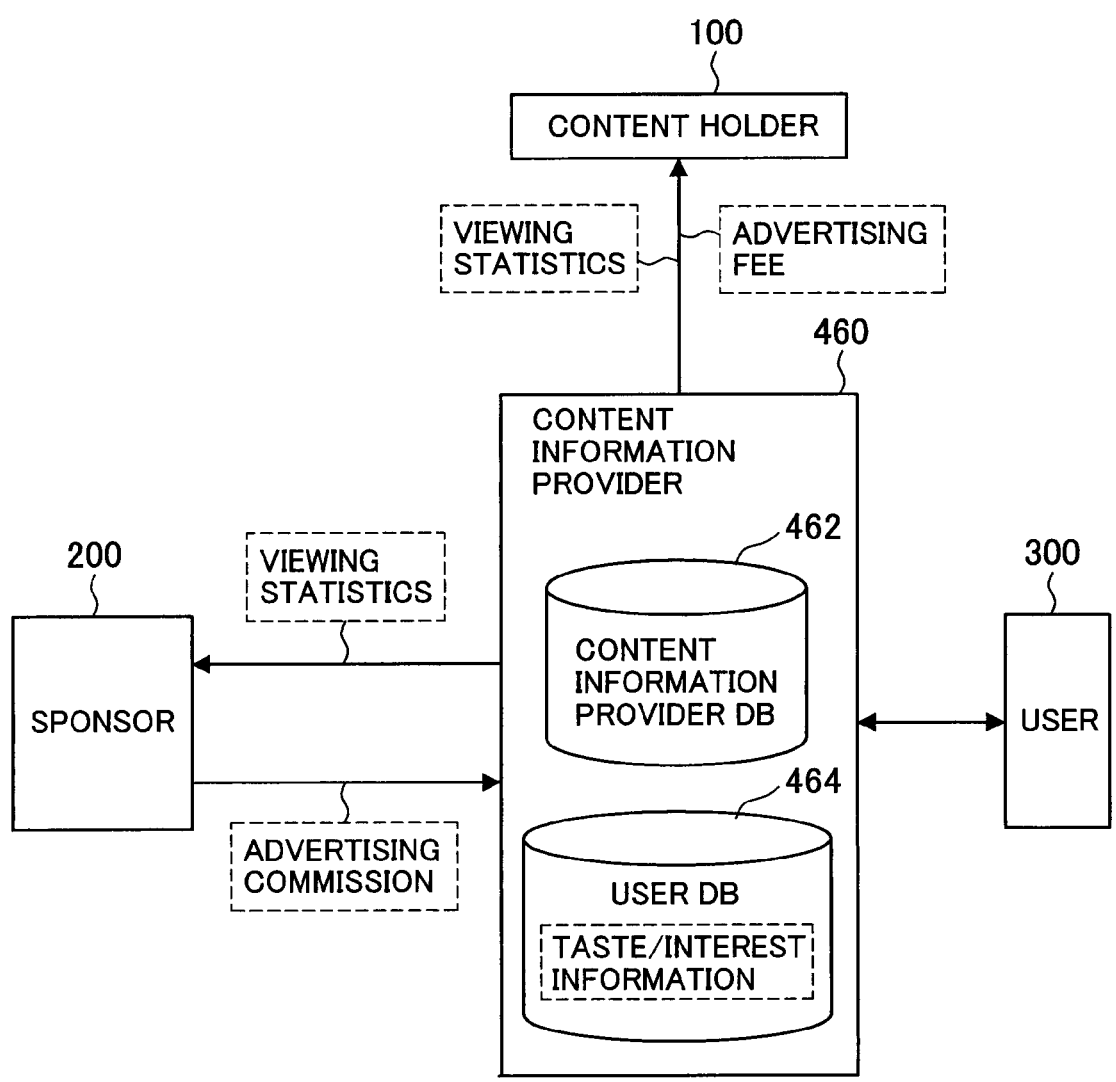
FIG. 12 illustrates the content information providing service offered in the embodiment.

Next, in reference to FIG. 12, the bidding results report processing is briefly explained. FIG. 12 schematically illustrates the bidding results report processing.

As shown in FIG. 12, the information providing unit 460 collects from the user terminals 300, user information such as statistical data indicating the frequencies with which advertisement information is accessed and accumulates user taste/interest information obtained by statistically analyzing the user information in the user DB 464. The taste/interest information is transmitted from the information providing unit 460 to the content holder terminals 100 and the sponsor terminals 200. Sponsors with successful bids each pay an advertising commission to the content holder.

(User Screen Display)

Figure 13:
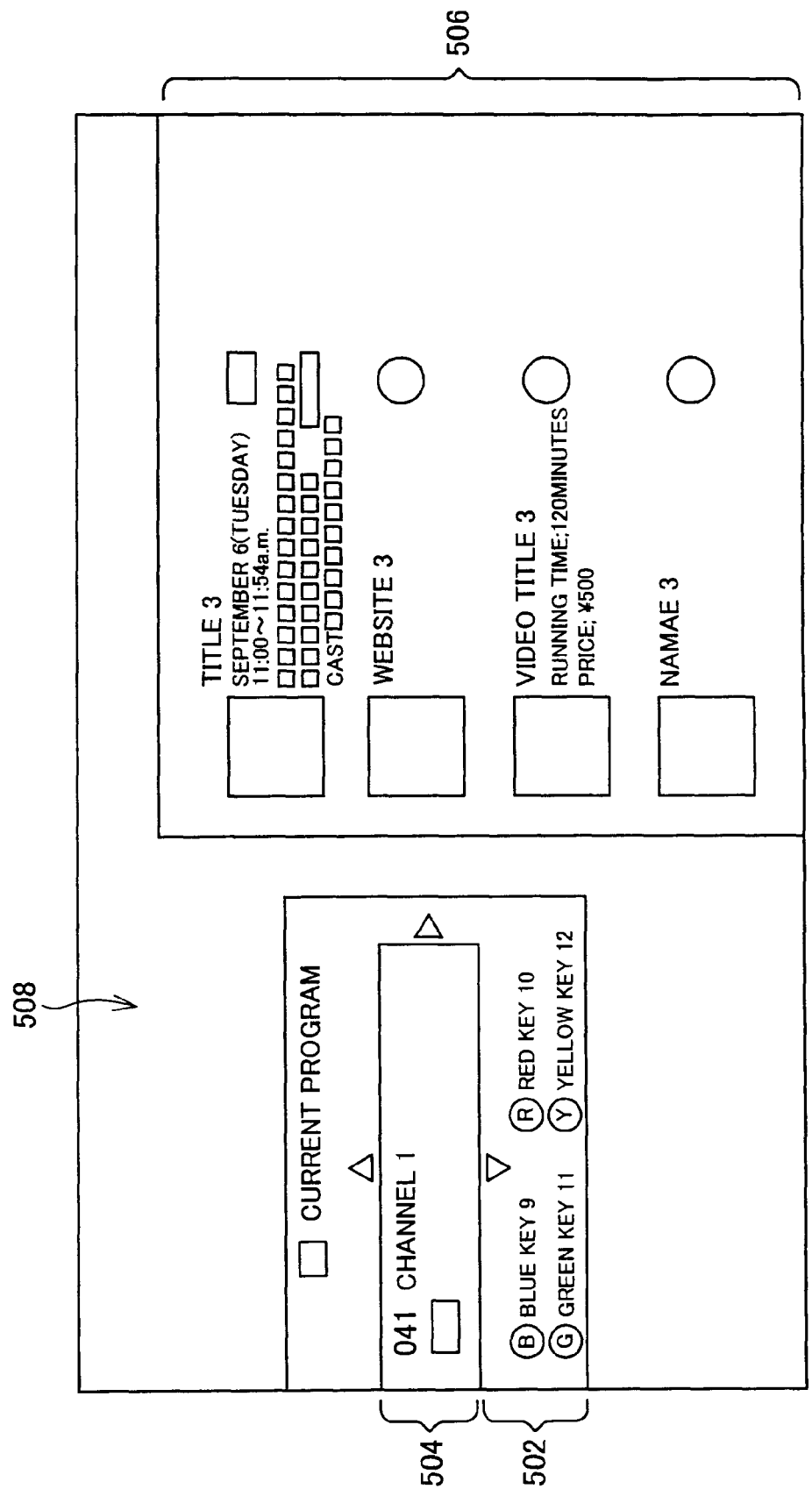
FIG. 13 shows the keyword selection screen brought up on display in the embodiment.

Next, in reference to FIG. 13, an example of a screen display containing front keyword and the like is explained. FIG. 13 presents an example of a structure that may be adopted in the display screen at the user terminal 300.

As shown in FIG. 13, the screen brought up on display at the user terminal 300 may include, for instance, a front keyword selection button area 502, a current content information display area 504, and a selectable content information display area 506 and a program display area 508. In the front keyword selection button area 502, a plurality of color-coded keyword buttons and front keyword each corresponding to one of the keyword buttons are displayed. For instance, as a specific button is pressed at the remote controller, the keyword button in the color matching the color of the depressed button is selected and the front keyword corresponding to the keyword button is selected. Then, a back keyword set in relation to the particular front keyword is selected and the advertisement information for use in relation to the back keyword is brought up on display.

In the current content information display area 504, the content information for use in relation to the program content currently on display over the program display area 508 is displayed. In the selectable content information display area 506, information indicating content available in the same time slot as that of the content indicated in the current content information display area 504, content in the same genre, content with the same cast or another type of related information is displayed. It will be obvious that the available content information display area may be set so as to display a predetermined type of information.

(Keyword Selection Processing Executed at the User Terminal 300)

Figure 14:
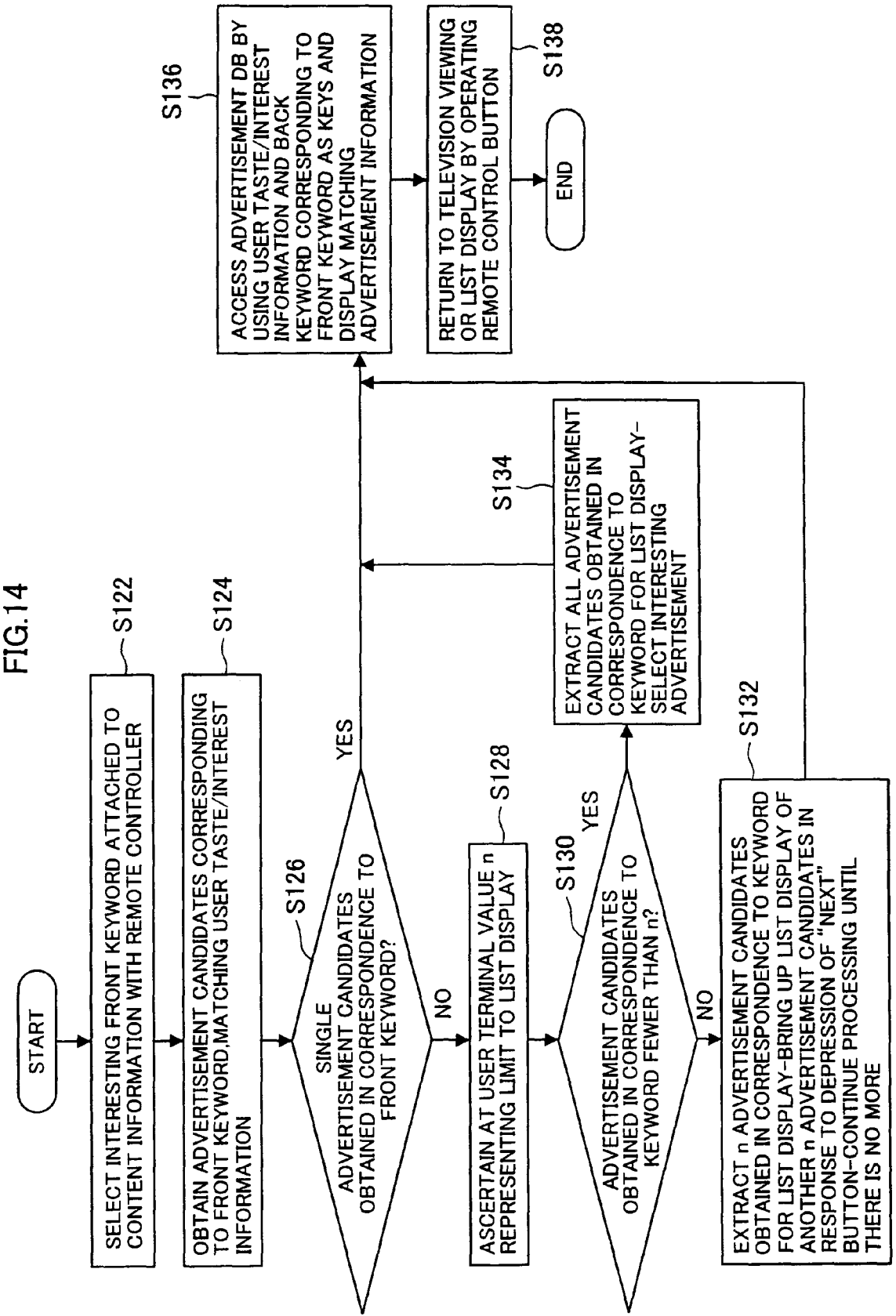
FIG. 14 presents a flowchart of the keyword selection processing executed in the embodiment.

Next, in reference to FIG. 14, the keyword selection processing executed as a keyword button is selected at the user terminal 300 is explained. FIG. 14 presents a flowchart of the keyword selection processing.

First, the user operates the user terminal 300 to select a front keyword assigned to specific content information. For instance, the user may be press a button at the remote controller constituting the operation unit of the user terminal 300 to select the front keyword corresponding to one of the keyword buttons on display (S122). Next, any advertisement information candidate corresponding to the front keyword, that fits with the user taste/interest information, is obtained at the user terminal (S124). Then, a decision is made as to whether there is a single advertisement candidate or a plurality of advertisement candidates having been obtained in correspondence to the front keyword (S126). If it is decided that only one advertisement candidate has been obtained in correspondence to the front keyword, a specific advertisement DB is accessed for a search executed by using the user taste/interest information and the back keywords set in relation to the front keyword and the advertisement information obtained through the search is brought up on display (S136). Then, the user presses a remote controller button to return to television viewing or a list display (S138).

If, on the other hand, it is decided that a plurality of advertisement candidates have been obtained in correspondence to the front keyword, the value "n" indicating a limit with regard to the list display is obtained at the user terminal 300 (S128). Then, a decision is made as to whether or not the number of advertisement candidates having been obtained in correspondence to the front keyword is fewer than n (S130). If it is decided that fewer than n advertisement information candidates have been obtained in correspondence to the front keyword, all the advertisement candidates corresponding to the front keyword are extracted and are included in the list display (S134). At this time, a specific set of advertisement information can be selected in the list display at the user terminal 300. Subsequently, a specific advertisement DB is accessed for a search executed by using the user taste/interest information and the back keywords set in relation to the front keyword and the advertisement information obtained through the search is brought up on display (S136). Then, the user presses a remote controller button to return to television viewing or a list display (S138).

If it is decided that the number of advertisement information candidates having been obtained in correspondence to the front keyword is equal to or greater than n, n advertisement candidates corresponding to the front keyword are extracted based upon a predetermined condition for a list display (S132). The user is then able to select specific advertisement information in the list display. Subsequently, a specific advertisement DB is accessed for a search executed by using the user taste/interest information and the back keywords set in relation to the front keyword and the advertisement information obtained through the search is brought up on display (S136). Then, the user presses a remote controller button to return to television viewing or a list display (S138). It is to be noted that if the value n representing the limit to the list display is 3 and 10 sets of advertisement information are obtained as advertisement information candidates, the sets of advertisement information are displayed in the following format; page 1: advertisement information 1~3, page 2: advertisement information 4~6, page 3: advertisement information 7~9, page 4: advertisement information 10. In other words, the value n representing the limit to the list display is determined for a single screen display.

(Keyword Registration Processing Executed at the Content Holder Terminal 100)

Figure 15:
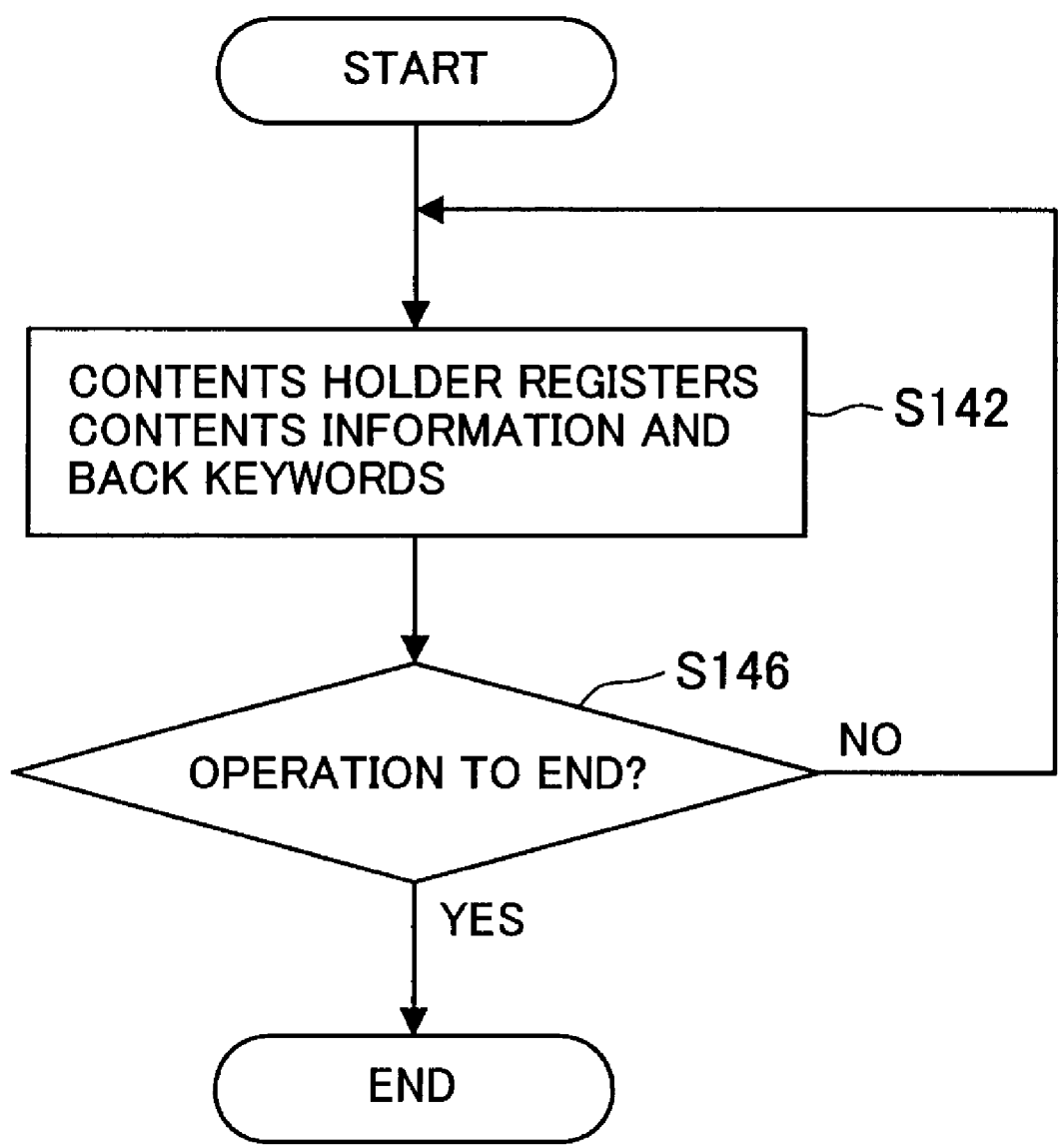
FIG. 15 presents a flowchart of the keyword registration processing executed in the embodiment.

Next, in reference to FIG. 15, the flow of the processing executed at each content holder terminal 100 to register back keywords for an auction transaction is explained. FIG. 15 presents a flowchart of the keyword registration processing executed to register keywords for an auction transaction. First, the content holder operates the content holder terminal 100 to register content information and back keywords in the advertisement registration unit 440 (S142). Subsequently, a decision is made as to whether or not to end the keyword registration operation (S146), and if it is decided to continue the registration operation, the registration processing is repeatedly executed.

(Bidding Results Verification Processing Executed at the Content Holder Terminal 100)

Figure 16:
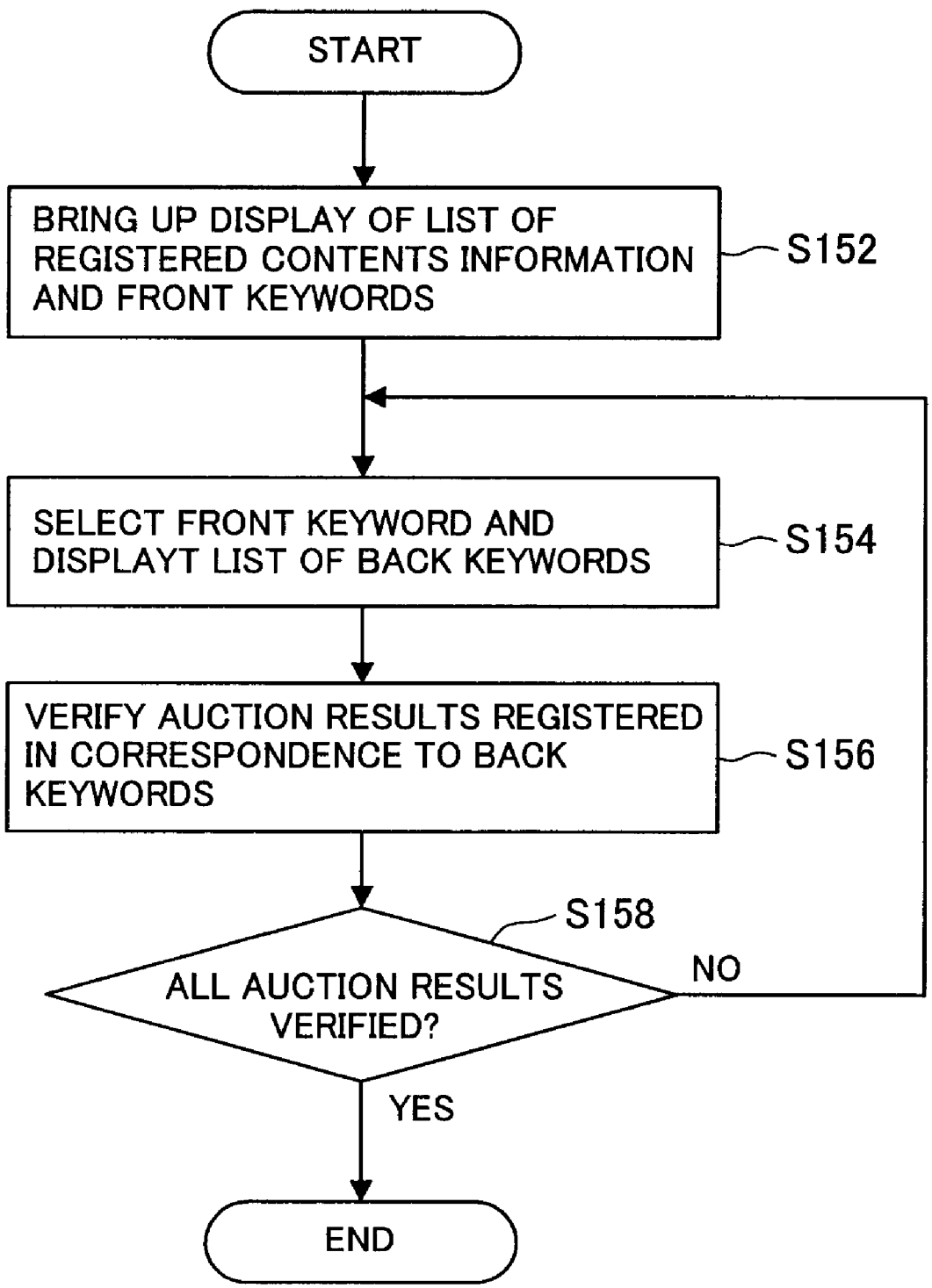
FIG. 16 illustrates the auction results verification processing executed in the embodiment.

Next, in reference to FIG. 16, the auction bidding results verification processing executed at the content holder terminal 100 is briefly explained. FIG. 16 presents a flowchart of the bidding results verification processing.

First, a list of the front keywords in correspondence to the registered content information and is displayed (S152). Next, a specific front keyword is selected and a list of the corresponding back keywords is brought up on display (S154). The results of auction transactions registered in correspondence to the individual back keywords are verified (S156). Subsequently, upon verifying all the auction transaction results, the verification processing ends (S158), whereas if there are auction transaction results yet to be verified, the front keyword selection processing (S154) is executed again.

(Bidding Information Registration Processing Executed at the Sponsor Terminal 200)

Figure 17:
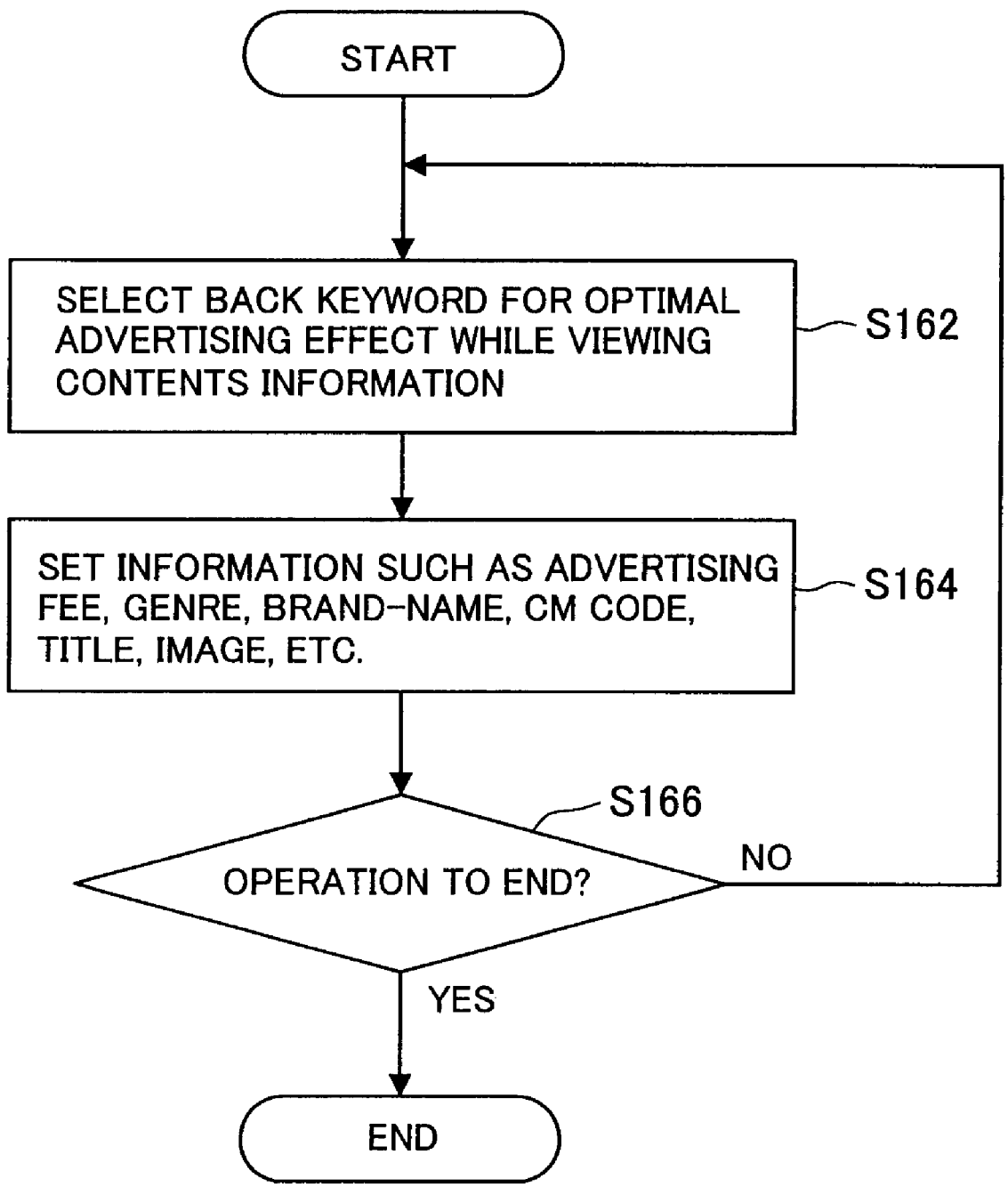
FIG. 17 illustrates the advertisement information registration processing executed in the embodiment.

In reference to FIG. 17, the bidding processing executed at each sponsor terminal 200 to tender a bid in an auction transaction is briefly explained. FIG. 17 presents a flowchart of the bidding processing executed to tender a bid in an auction transaction.

The sponsor viewing content information selects a back keyword that he considers to promise optimal advertising effect for his advertisement information (S162). Next, the sponsor sets information such as the advertising fee, the genre, the brand-name, the CM code, the title, an image and the like (S164). Subsequently, the bidding information registration processing may end (S166) or the processing may be repeated starting with content information viewing (S162).

CONCLUSION

Figure 18:
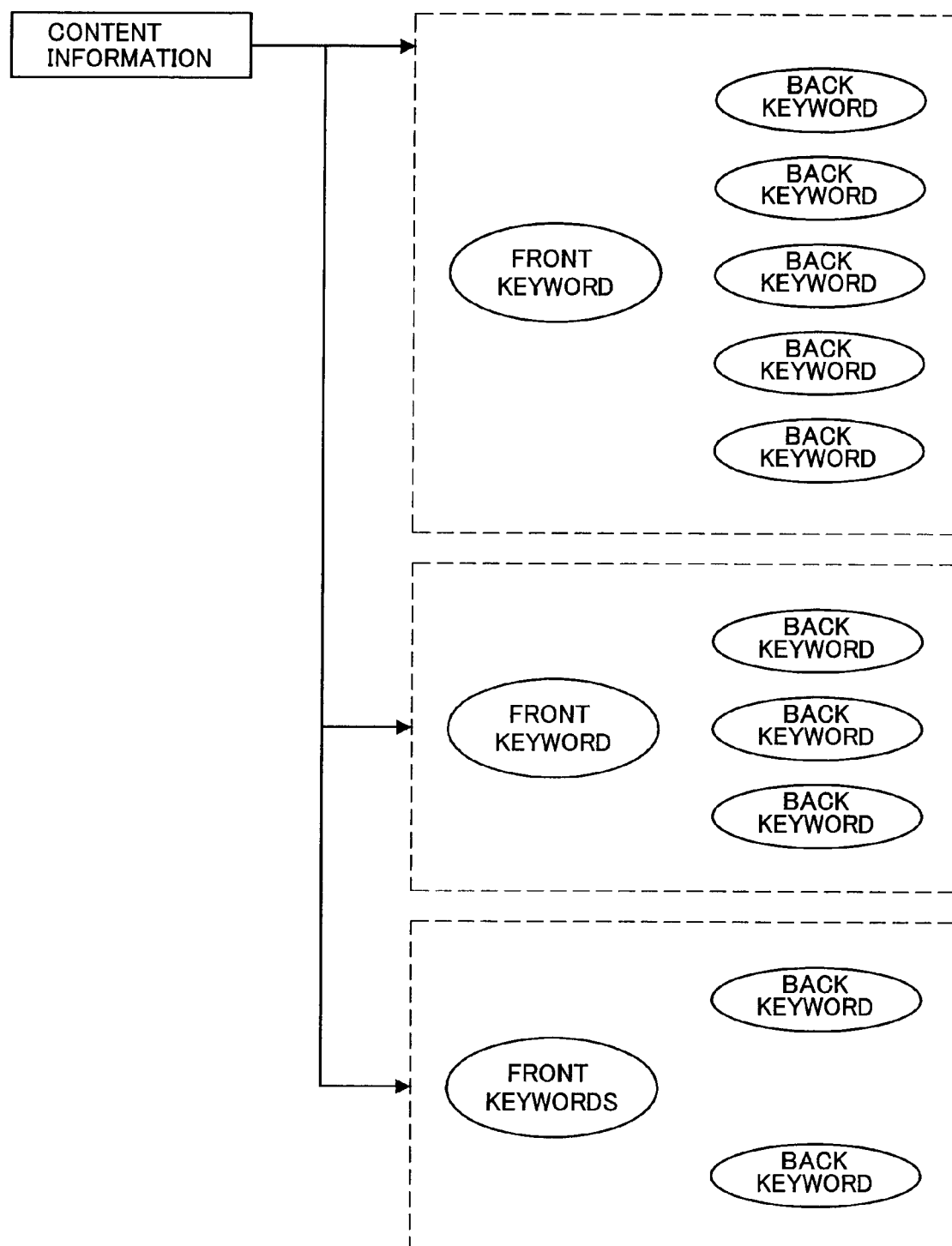
FIG. 18 shows the relationship between the content and the keywords set forth in the embodiment.

As explained above, front keywords and back keywords are set in relation to each set of content distributed to user terminals 300, in addition to content information for use in relation to the details of the content. Advertisement information provided from sponsor terminals 200 is selected in correspondence to the keywords, so as to achieve optimal advertising effect in line with the intent of both the sponsors and the content holder. The keywords and the content information may have a relationship such as that shown in FIG. 18. In the relationship between the content information and the front/back keywords shown in FIG. 18, a single front keyword or a plurality of front keyword are set in correspondence to a set of content information, with at least one back keyword set in relation to each front keyword. It is desirable to set a tempting phrase that will grab the user's attention immediately for each front keyword, as front keyword are directly displayed at the user terminal 300. Back keywords, on the other hand, are keywords disclosed only to the sponsor terminals 200 and, for this reason, it is desirable to set as many back keywords as possible. Moreover, the content information may be written by using codes such as those in the example presented in FIG. 19, the advertisement information may be written by using codes such as those in the example presented in FIG. 20 and the retail product information may be written by using codes such as those used in the example presented in FIG. 21.

It should be understood by those skilled in the art that various modifications, combinations, sub combinations and alterations may be made depending upon design requirements and other factors insofar as they are within the scope of the appended claims or equivalents thereof.

What is claimed is:

1. An information providing system comprising:
   an information registration unit, implemented on a processor, configured to register, using the processor, a front keyword for use in relation to content or content information to be provided to a user terminal and a back keyword set in relation to the front keyword;
   an advertisement registration unit configured to register advertisement information for use in relation to the back keywords; and
   an information providing unit configured to provide the advertisement information to the user terminal, wherein the information registration unit includes
   a front keyword registration unit that registers the front keyword for use in relation to the content or content information;
   a back keyword registration unit that registers the back keyword for use in relation to the front keyword, the back keyword being a keyword that is not provided to a user at the user terminal; and an advertisement information registration unit that obtains the advertisement information having been registered by the advertisement registration unit and sets the advertisement information in relation to the back keyword; wherein the advertisement registration unit includes an advertisement selection unit that selects advertisement information to be set in relation to the back keyword based upon bid information corresponding to the back keyword, obtained from sponsor terminals belonging to sponsors providing the advertisement information; and an advertisement registration unit that registers the advertisement information having been selected by the advertisement selection unit; and wherein the information providing unit includes a display controller that displays at the user terminal the front keyword together with keyword buttons each operated to select a front keyword; and an advertisement providing unit that receives the front keyword selected through the keyword button and provides to the user terminal advertisement information selected by the advertisement selection unit in correspondence to the back keyword registered in relation to the front keyword.

2. An information providing system according to claim 1, wherein:

the advertisement selection unit selects a predetermined number of sets of advertisement information with highest bids tendered in correspondence to the back keyword among a plurality of sets of advertisement information submitted for bidding in correspondence to the particular back keyword.

3. An information providing system according to claim 2, wherein:

the advertisement selection unit selects some sets of advertisement information among the predetermined number of sets of advertisement information with the highest bids based upon specific conditions determined in advance by a content holder providing the content and sponsors providing the advertisement information.

4. An information providing system according to claim 2, wherein:

the advertisement selection unit extracts sets of advertisement information of a specific type from the predetermined number of sets of advertisement information with the highest bids and selects a specific number of sets of advertisement information with higher bids among the extracted sets of advertisement information.

5. An information providing system according to claim 1, wherein the back keyword registration unit registers the back keyword by receiving an input from a content holder based on a display screen.

6. An information providing system according to claim 1, wherein the back keyword registration unit registers the back keyword based on an input of a content holder of the content.

7. An information providing method, implemented on a processor, through which advertisement information for use in relation to a specific back keyword is provided to a user terminal based upon a front keyword for use in relation to content or content information to be provided to the user terminal and back keywords for use in relation to the front keyword, said method comprising:

registering, using the processor, a front keyword for use in relation to the content;

registering, using the processor, the back keyword for use in relation to the front keyword, the back keyword being a keyword that is not provided to a user at the user terminal;

selecting advertisement information to be set in relation to the back keyword based upon bid information obtained from sponsor terminals providing advertisement information in correspondence to the back keyword;

registering the advertisement information having been selected in the selecting advertisement information;

setting the advertisement information having been registered in the registering the advertisement information in relation to the back keyword;

displaying the front keyword and a keyword button operated to select the front keyword at the user terminal; and receiving the front keyword selected through the keyword button from the user terminal and providing the advertisement information having been selected in the selecting advertisement information to the user terminal in correspondence to the back keyword registered in relation to the front keyword.

8. An information providing method according to claim 7, wherein the selecting advertisement information includes selecting a predetermined number of sets of advertisement information with highest bids tendered in correspondence to the back keyword among a plurality of sets of advertisement information submitted for bidding in correspondence to the particular back keyword.

9. An information providing method according to claim 8, wherein the selecting advertisement information includes selecting some sets of advertisement information among the predetermined number of sets of advertisement information with the highest bids based upon specific conditions determined in advance by a content holder providing the content and sponsors providing the advertisement information.

10. An information providing method according to claim 8, wherein the selecting advertisement information includes extracting sets of advertisement information of a specific type from the predetermined number of sets of advertisement information with the highest bids and selecting a specific number of sets of advertisement information with higher bids among the extracted sets of advertisement information.

11. An information providing method according to claim 7, wherein the registering the back keyword includes receiving an input from a content holder based on a display screen.

12. An information providing method according to claim 7, wherein the registering the back keyword is based on an input of a content holder of the content.

13. A non-transitory computer-readable medium encoded with instructions which, when executed by a processor, cause the processor to execute a method for providing to a user terminal advertisement information for use in relation to a back keyword based upon a front keyword for use in relation to content or content information to be provided to the user terminal and the back keyword for use in relation to the front keyword, said method comprising:

registering the front keyword for use in relation to content or content information;

registering a back keyword for use in relation to the front keyword, the back keyword being a keyword that is not provided to a user at the user terminal;

selecting advertisement information to be set in relation to the back keyword based upon bid information obtained from sponsor terminals providing advertisement information in correspondence to the back keyword;

registering the advertisement information having been selected in the selecting advertisement information;

setting the advertisement information having been registered in the registering the advertisement information in relation to the back keyword;

displaying the front keyword and a keyword button operated to select the front keyword at the user terminal; and receiving the front keyword selected through the keyword button from the user terminal and providing the advertisement information having been selected in the selecting advertisement information to the user terminal in correspondence to the back keyword registered in relation to the front keyword.

14. A non-transitory computer-readable medium according to claim 13, wherein the selecting advertisement information includes selecting a predetermined number of sets of advertisement information with highest bids tendered in correspondence to the back keyword among a plurality of sets of advertisement information submitted for bidding in correspondence to the particular back keyword.

15. A non-transitory computer-readable medium according to claim 14, wherein the selecting advertisement information includes selecting some sets of advertisement information among the predetermined number of sets of advertisement information with the highest bids based upon specific conditions determined in advance by a content holder providing the content and sponsors providing the advertisement information.

16. A non-transitory computer-readable medium according to claim 14, wherein the selecting advertisement information includes extracting sets of advertisement information of a specific type from the predetermined number of sets of advertisement information with the highest bids and selecting a specific number of sets of advertisement information with higher bids among the extracted sets of advertisement information.

17. A non-transitory computer-readable medium according to claim 13, wherein the registering the back keyword includes receiving an input from a content holder based on a display screen.

18. A non-transitory computer-readable medium according to claim 13, wherein the registering the back keyword is based on an input of a content holder of the content.

* * * * *